US012597285B2

(12) United States Patent
Inoue

(10) Patent No.: US 12,597,285 B2
(45) Date of Patent: Apr. 7, 2026

(54) IMAGE PROCESSING APPARATUS WITH AUTOMATED DIVISION OF SCANNED FORMS INTO INDIVIDUAL DOCUMENTS, AND IMAGE PROCESSING METHOD AND STORAGE MEDIUM FOR SAME

(71) Applicant: CANON KABUSHIKI KAISHA, Tokyo (JP)

(72) Inventor: Kenta Inoue, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 335 days.

(21) Appl. No.: 18/193,250

(22) Filed: Mar. 30, 2023

(65) Prior Publication Data

US 2023/0368558 A1     Nov. 16, 2023

(30) Foreign Application Priority Data

May 13, 2022     (JP) ................................. 2022-079408

(51) Int. Cl.
*G06V 30/418*          (2022.01)
*G06V 30/412*          (2022.01)

(52) U.S. Cl.
CPC .......... *G06V 30/418* (2022.01); *G06V 30/412* (2022.01)

(58) Field of Classification Search
CPC ........... G06V 30/40–43; G06V 30/418; G06V 30/412
See application file for complete search history.

(56) References Cited

U.S. PATENT DOCUMENTS

| 2007/0065011 A1* | 3/2007 | Schiehlen | ............ G06V 30/416 382/209 |
| 2021/0368050 A1 | 11/2021 | Inoue et al. | ............. H04N 1/00 |
| 2022/0237398 A1* | 7/2022 | Asermely | ............ G06F 3/0483 |

FOREIGN PATENT DOCUMENTS

| JP | 2020-170942 | 10/2020 |

* cited by examiner

*Primary Examiner* — Casey L Kretzer
(74) *Attorney, Agent, or Firm* — Venable LLP

(57) ABSTRACT

An image processing apparatus obtains scanned images by scanning forms of a plurality of types; manages page counts associated with feature information of previous scanned images of respective form types; analyzes each of the scanned images to determine, based on the feature information, whether the analyzed scanned image is similar to any of the previous scanned images; and divides the scanned images based on a scanned image to determined to be similar to any of the previous scanned images and the page count associated with the any of the previous scanned images.

10 Claims, 17 Drawing Sheets

Figure 10:
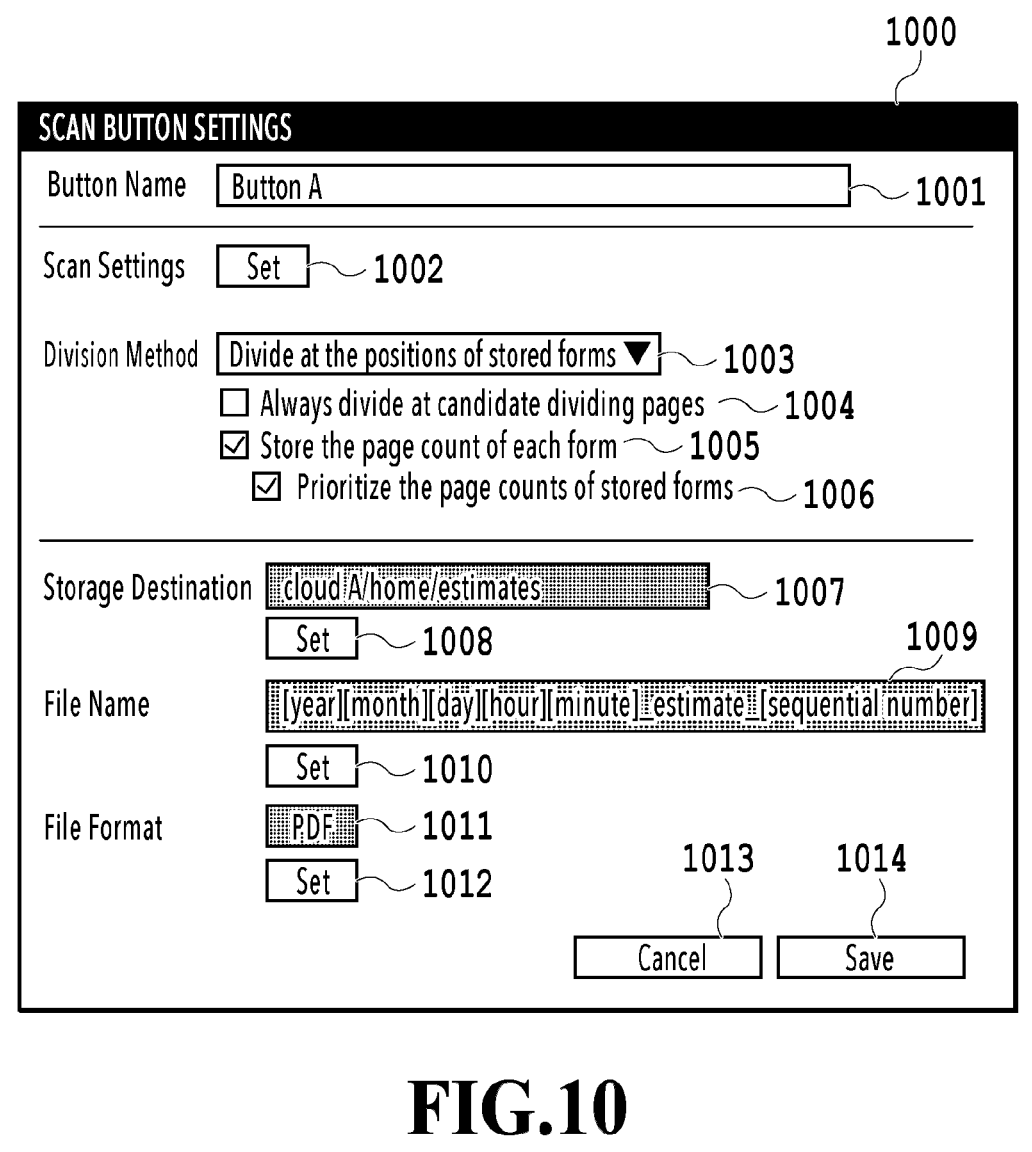

1000

SCAN BUTTON SETTINGS

Button Name    | Button A | ～1001

Scan Settings    | Set | ～1002

Division Method    | Divide at the positions of stored forms ▼ | ～1003
☐ Always divide at candidate dividing pages ～1004
☑ Store the page count of each form ～1005
    ☑ Prioritize the page counts of stored forms ～1006

Storage Destination    cloud A/home/estimates ～1007
| Set | ～1008

1009

File Name    [year][month][day][hour][minute]_estimate_[sequential number]
| Set | ～1010

File Format    PDF ～1011
| Set | ～1012

1013    1014

| Cancel |   | Save |

| FORM ID | ARRANGEMENT INFORMATION | PAGE COUNT |
|---------|-------------------------|------------|
| FormA001 | a001.json | 2 |
| FormA002 | a002.json | 4 |
| FormA003 | a003.json | 1 |

FIG.13

| PAGE NUMBER | SIMILAR FORM | CORRECT PAGE COUNT | PRESENT PAGE COUNT |
|:---:|:---:|:---:|:---:|
| 1401 | 1402 | 1403 | 1404 |
| 1 | FormA001 | 2 | 2 |
| 2 | NONE | - | - |
| 3 | FormA002 | 4 | 4 |
| 4 | NONE | - | - |
| 5 | NONE | - | - |
| 6 | NONE | - | - |
| 7 | FormA001 | 2 | 2 |
| 8 | NONE | - | - |
| 9 | FormA001 | 2 | 2 |
| 10 | NONE | - | - |

FIG.14A

| PAGE NUMBER | SIMILAR FORM | CORRECT PAGE COUNT | PRESENT PAGE COUNT |
|:---:|:---:|:---:|:---:|
| 1401 | 1402 | 1403 | 1404 |
| 1 | FormA001 | 2 | 2 |
| 2 | NONE | - | - |
| 3 | FormA002 | 2 | 4 |
| 4 | NONE | - | - |
| 5 | NONE | - | - |
| 6 | NONE | - | - |

FIG.14B

| PAGE NUMBER | SIMILAR FORM | CORRECT PAGE COUNT | PRESENT PAGE COUNT | NEW FORM |
|:---:|:---:|:---:|:---:|:---:|
| 1401 | 1402 | 1403 | 1404 | 1405 |
| 1 | FormA001 | 2 | 2 | - |
| 2 | NONE | - | - | - |
| 3 | FormA002 | 2 | 2 | - |
| 4 | NONE | - | - | - |
| 5 | FormA025 | 1 | 1 | Yes |
| 6 | FormA025 | 1 | 1 | Yes |

FIG.14C

IMAGE PROCESSING APPARATUS WITH AUTOMATED DIVISION OF SCANNED FORMS INTO INDIVIDUAL DOCUMENTS, AND IMAGE PROCESSING METHOD AND STORAGE MEDIUM FOR SAME

BACKGROUND OF THE DISCLOSURE

Field of the Disclosure

The present disclosure relates to a technique for dividing a group of page-by-page scanned images.

Description of the Related Art

One purpose for users to scan forms is to computerize paper forms. By storing files obtained by computerizing forms in a cloud storage, the user can check the contents of the forms anytime and anywhere. Also, computerizing forms saves storage space for paper forms. In a case of computerizing forms, the user may collect a plurality of forms in advance and computerize the plurality of forms by dividing a group of page-by-page scanned images obtained by collectively scanning the plurality of forms into sets of scanned images as desired by the user.

Japanese Patent Laid-Open No. 2020-170942 discloses a method in which a group of images obtained by scanning forms of a plurality of types is divided based on images of pages in the group similar to stored templates. Japanese Patent Laid-Open No. 2020-170942 also discloses a method in which a new form for which no template has been stored is scanned first so that whether the group of page-by-page scanned images includes an image of a new form can be determined.

However, with Japanese Patent Laid-Open No. 2020-170942, it is impossible to determine whether a group of page-by-page scanned images includes an image of a new form unless the forms of a plurality of types are scanned with the new form first. For example, in a case where a new form is included inside a stack of forms of a plurality of types, an image of that new form will be computerized as an image of a page in the preceding form. Hence, the user must find the new form out of the forms of the plurality of types to be scanned, and scan them with the new form first. This imposes a burden on the user.

SUMMARY OF THE DISCLOSURE

An image processing apparatus of the present disclosure includes: at least one memory that stores instructions; and at least one processor that executes the instructions to: obtain scanned images by scanning forms of a plurality of types; manage page counts associated with feature information of previous scanned images of respective form types; analyze each of the scanned images to determine, based on the feature information, whether the analyzed scanned image is similar to any of the previous scanned images; and divide the scanned images based on a scanned image determined to be similar to any of the previous scanned images and the page count associated with the any of the previous scanned images.

Further features of the present disclosure will become apparent from the following description of exemplary embodiments with reference to the attached drawings.

BRIEF DESCRIPTION OF THE DRAWINGS

FIG. 10 is a diagram illustrating an example of a scan button registration screen;

FIG. 13 is a diagram illustrating an example of pieces of information associated with registered previous scanned images;

FIGS. 14A to 14C are diagrams illustrating some examples of analysis result information;

DESCRIPTION OF THE EMBODIMENTS

An embodiment of the technique of the present disclosure will be described below using the drawings. Note that the following embodiment does not limit the technique according to the claims, and not all the combinations of the features described in the following embodiments are necessarily essential for the solution to be provided by the technique of the present disclosure.

First Embodiment

[System Configuration]

Figure 1:
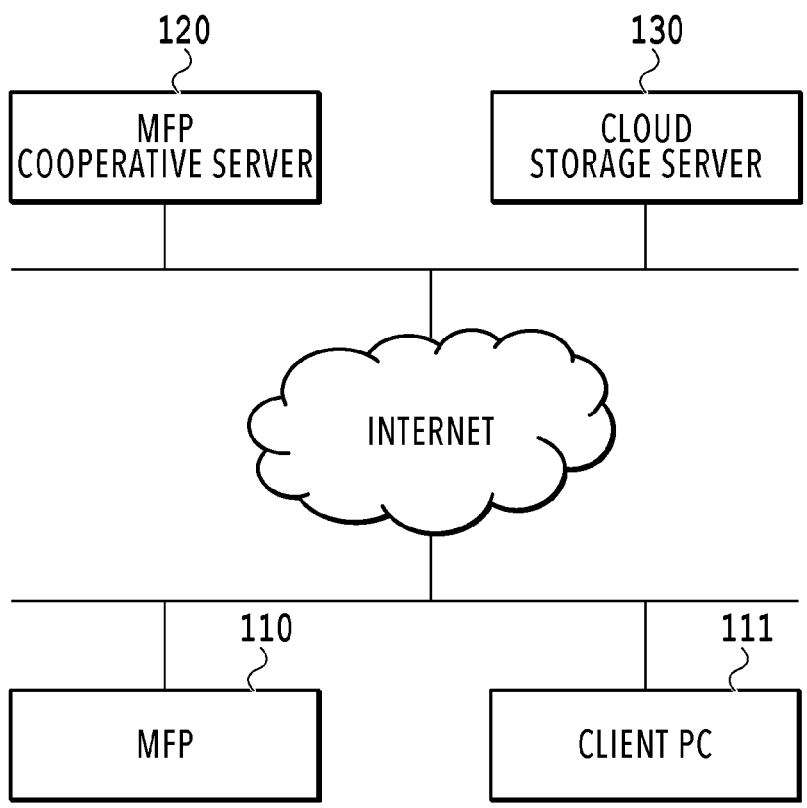
FIG. 1 is a diagram illustrating an entire configuration of a system.

FIG. 1 is a diagram illustrating an entire configuration of an image processing system according to a first embodiment. First, the image processing system in FIG. 1 will be described. The image processing system in FIG. 1 has an MFP 110, an MFP cooperative server 120, a cloud storage server 130, and a client personal computer (PC) 111. The MFP 110 is communicatively connected to a server that provides various services over the Internet via a local area network (LAN).

The MFP 110 is a multifunction peripheral having a plurality of functions such as those of a scanner and a printer, and represents an example of an image forming apparatus. The MFP 110 is an image forming apparatus that cooperates with a cloud service which provides a service such as cloud storage. Such an image forming apparatus stores scanned images obtained by scanning forms in cloud storages designated by users, and thus has a function of transmitting data of the generated scanned images. The client PC 111 is an information processing apparatus that receives services from the MFP cooperative server 120.

The MFP cooperative server 120 represents an example of a server that provides services such as storing therein image files obtained by scanning by the MFP 110 or transferring the image files to a different server which provides a file storage service or the like. Hereinafter, the cloud service provided by the MFP cooperative server 120 will be referred to as "MFP cooperative service".

The cloud storage server 130 is a server that provides services such as storing files received through the Internet and allowing external apparatuses to obtain files through web browsers. In the image processing system, there are a plurality of cloud storage servers including the cloud storage server 130. Hereinafter, the cloud service provided by the cloud storage server 130 will be referred to as "cloud storage service".

The image processing system in the present embodiment has the MFP 110, the MFP cooperative server 120, the cloud storage server 130, and the client PC 111 but is not limited to this configuration. For example, the MFP 110 may also serve as the client PC 111 or the MFP cooperative server 120. Also, the form of connection may be such that the MFP cooperative server 120 is installed as a server on a LAN, not on the Internet. Moreover, the cloud storage server 130 may be replaced with a mail server or the like, and attach an image obtained by scanning to an email message and transmit it.

[Hardware Configuration of MFP]

Figure 2:
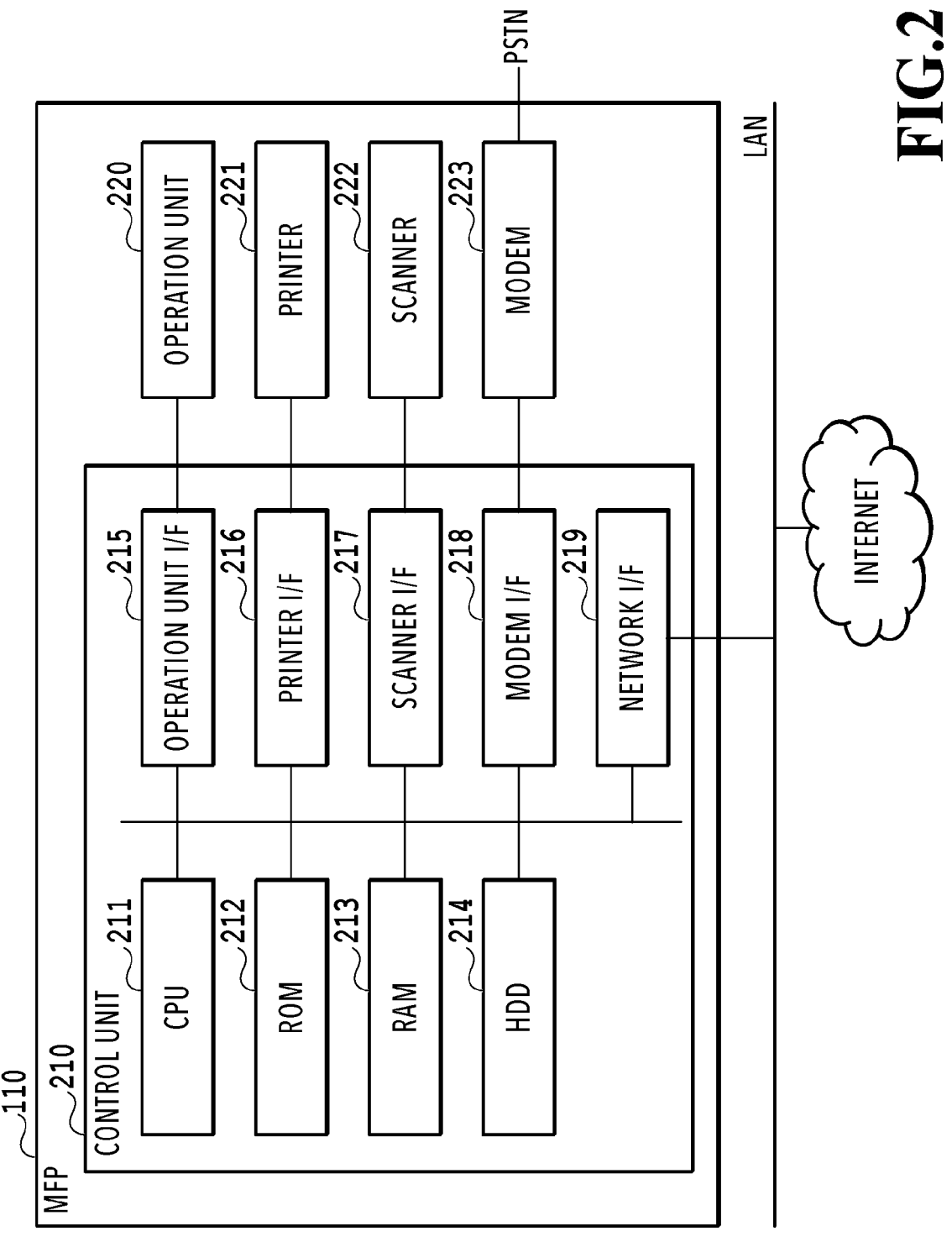
FIG. 2 is a hardware configuration diagram of a multi-function peripheral (MFP)

FIG. 2 is a block diagram illustrating a hardware configuration of the MFP 110. The MFP 110 has a control unit 210, an operation unit 220, a printer 221, a scanner 222, and a modem 223.

The control unit 210 includes components 211 to 219 below and controls the operation of the entire MFP 110. The CPU 211 reads out and executes various control programs stored in the ROM 212 (programs corresponding to the various functions illustrated in the functional arrangement diagram of FIG. 4). The RAM 213 is used as temporary storage areas such as a main memory and a work area for the CPU 211. Note that in the present embodiment, a single CPU 211 uses a single memory (RAM 213 or HDD 214) to execute the processes illustrated in the flowcharts to be mentioned later. However, the configuration is not limited to this. For example, a plurality of CPUs and a plurality of RAMs or HDDs may be caused to cooperate with each other to execute the processes. The HDD 214 is a large-capacity storage unit that stores image data and various programs.

The operation unit I/F 215 is an interface that connects the operation unit 220 and the control unit 210. The operation unit 220 includes a touch panel that functions also as a display unit, a keyboard, and the like, and accepts user operations, inputs, and instructions. Note that touch operations on the touch panel include operations with a person's finger and operations with a stylus.

The printer I/F 216 is an interface that connects the printer 221 and the control unit 210. Image data to be printed is transferred from the control unit 210 to the printer 221 via the printer I/F 216, and printed onto a print medium such as paper.

The scanner I/F 217 is an interface that connects the scanner 222 and the control unit 210. The scanner 222 generates scanned image data by optically reading a document set on platen glass or auto document feeder (ADF) not illustrated, and inputs the scanned image data to the control unit 210 via the scanner I/F 217. The scanned image data generated by the scanner 222 by reading can be printed (output as a photocopy) by the printer 221, stored in the HDD 214, or transmitted in the form of a file to an external apparatus such as the MFP cooperative server 120 via a LAN.

The modem I/F 218 is an interface that connects the modem 223 and the control unit 210. The modem 223 performs facsimile communication of image data with a facsimile (not illustrated) on a public switched telephone network (PSTN).

The network I/F 219 is an interface that connects the control unit 210 (MFP 110) to a LAN. By using the network I/F 219, the MFP 110, for example, transmits data of scanned images to the MFP cooperative server 120 and receives various pieces of data from the MFP cooperative server 120. The hardware configuration of the MFP 110 described above is an example and may include another component(s) or omit some of the components as necessary.

[Hardware Configuration of MFP Cooperative Server, Cloud Storage Server, and Client PC]

Figure 3:
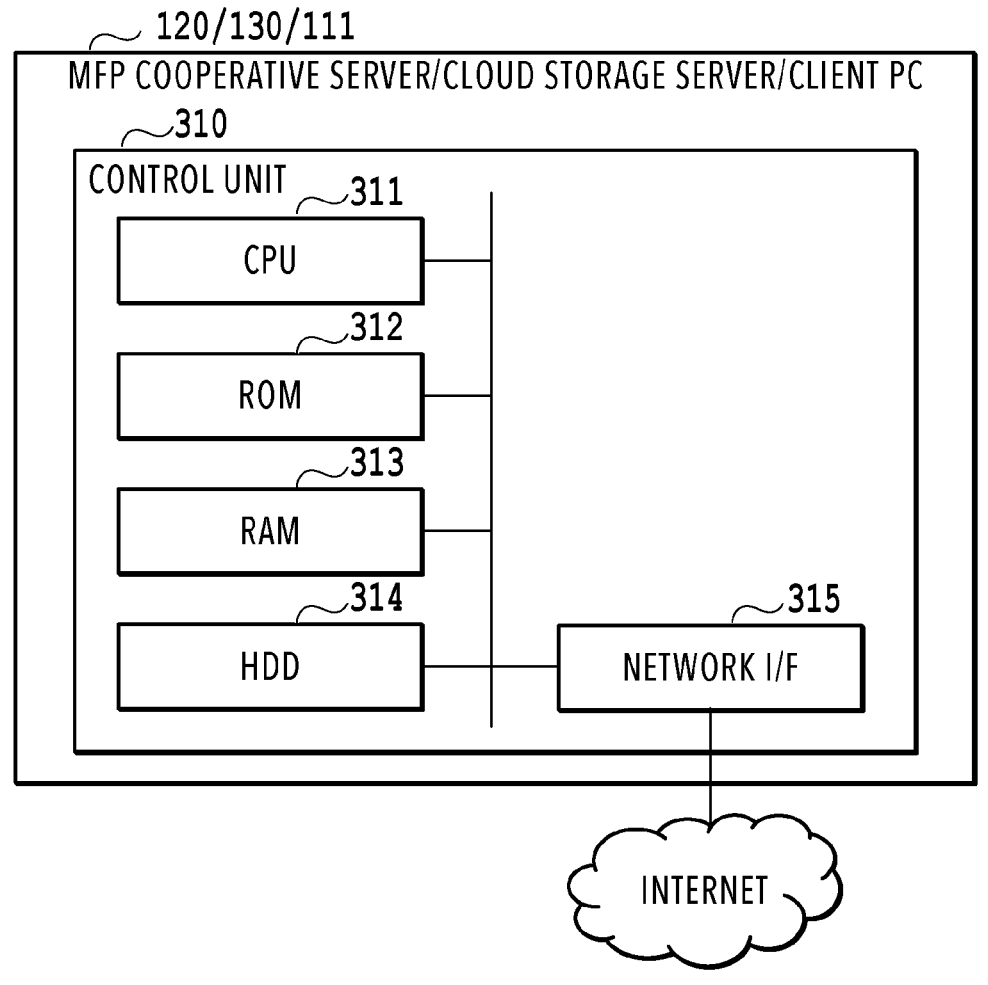
FIG. 3 is a hardware configuration diagram of an MFP cooperative server, a cloud storage server, and a client PC.

FIG. 3 is a block diagram illustrating hardware configurations of the MFP cooperative server 120, the cloud storage server 130, and the client PC 111. The MFP cooperative server 120, the cloud storage server 130, and the client PC 111 each have a CPU 311, a ROM 312, a RAM 313, an HDD 314, and a network I/F 315. The CPU 311 reads out a control program stored in the ROM 312 and executes various processes to control the entire operation. The RAM 313 is used as temporary storage areas such as a main memory and a work area for the CPU 311. The HDD 314 is a large-capacity storage unit that stores image data and various programs. The network I/F 315 is an interface that connects the control unit 310 to the Internet. The MFP cooperative server 120, the cloud storage server 130, and the client PC 111 receive requests for various processes from other apparatuses (such as the MFP 110) and return process results corresponding to these requests via the network I/F 315.

[Functional Arrangement of Image Processing System]

Figure 4:
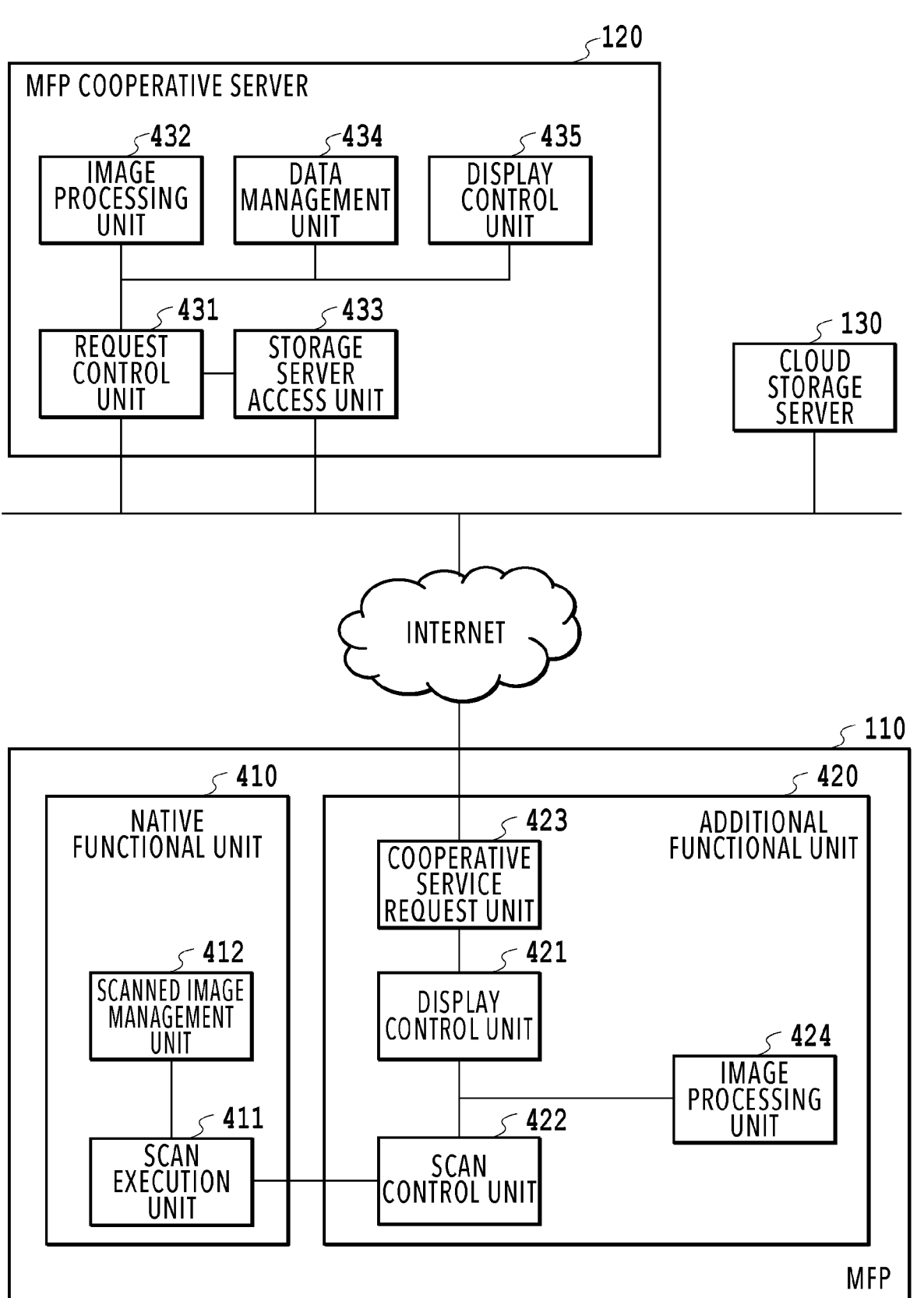
FIG. 4 is a functional arrangement diagram of the system.

FIG. 4 is a block diagram illustrating a functional arrangement of the image processing system according to the present embodiment. Functional arrangements corresponding to the roles of the MFP 110 and the MFP cooperative server 120 forming the image processing system will be described below in turn. Note that the description will focus on, of the various functions of each apparatus, functions related to processes from scanning a document to computerize it (convert it into a file) to storing the computerized document in the cloud storage server 130.

[Functional Arrangement of MFP]

The MFP 110 also has functionality of an information processing apparatus, and has two functional modules—a native functional unit 410 and an additional functional unit 420. The native functional unit 410 is an application normally included in the MFP 110 whereas the additional functional unit 420 is an application additionally installed in the MFP 110. The additional functional unit 420 is a Java (registered trademark)-based application. This enables functions to be easily added to the MFP 110. Note that other additional applications not illustrated may be installed in the MFP 110.

The native functional unit 410 has a scan execution unit 411 and a scanned image management unit 412. The additional functional unit 420 has a display control unit 421, a scan control unit 422, a cooperative service request unit 423, and an image processing unit 424.

The display control unit 421 displays user interface screens (UI screens) for accepting various user operations on the touch panel of the operation unit 220. Examples of the various user operations include inputting login authentication information for accessing the MFP cooperative server 120, configuring the scan settings, issuing an instruction to start a scan, setting a file name, issuing an instruction to store a file, and so on.

In response to an user operation performed on a UI screen (e.g., pressing a "Start scan" button), the scan control unit 422 issues an instruction to execute a scan process based on scan settings to the scan execution unit 411.

According to the instruction to execute a scan process from the scan control unit 422, the scan execution unit 411 causes the scanner 222 to execute a document read operation via the scanner I/F 217 to thereby generate a scanned image.

The scanned image management unit 412 stores data of the generated scanned image in the HDD 214. At this time, the scan control unit 422 is notified of information of a scanned image identifier uniquely indicating the stored scanned image. The scanned image identifier is a number, a symbol, alphabetical characters, and the like uniquely identifying the image obtained by a scan by the MFP 110. The scan control unit 422 can, for example, obtain the data of a scanned image to be converted into a file from the scanned image management unit 412 by using the above scanned image identifier. Then, the scan control unit 422 instructs the cooperative service request unit 423 to issue a request to the MFP cooperative server 120 for processes necessary for the conversion into a file.

The cooperative service request unit 423 functions as a transmission/reception unit that, for example, transmits requests for various processes to the MFP cooperative server 120 and receives responses for those requests. Examples of the various processes include login authentication, analysis of a scanned image, transmission of a scanned image, and so on. A communication protocol such as Representational State Transfer (REST) or Simple Object Access Protocol (SOAP) is used in the communication with the MFP cooperative server 120. The image processing unit 424 performs predetermined processes on scanned images. Note that an apparatus other than the MFP 110 (an information processing apparatus such as the client PC 111) may have some of the functions implemented by the above-described additional functional unit 420 and the like.

The CPU 211 implements the functional units of the MFP 110 by reading out programs stored in the ROM 212 or the HDD 214 of the MFP 110 to the RAM 213 and executing them.

The configuration may be such that a program (module) for performing an operation such as selecting a division method or the like on the client PC is installed in the client PC in advance. However, the configuration is not limited to this. For example, the configuration may be such that a general-purpose web browser provided to the client PC is utilized to obtain a web application for setting a file name or the like from the MFP cooperative server 120 and execute it.

[Functional Arrangement of Server Apparatus]

A functional arrangement of the MFP cooperative server 120 will be described using FIG. 4. The MFP cooperative server 120 has a request control unit 431, an image processing unit 432, a storage server access unit 433, a data management unit 434, and a display control unit 435.

The request control unit 431 also functions as a reception unit that receives requests from external apparatuses, and waits in a state in which it can receive requests from the external apparatuses. Moreover, the request control unit 431 instructs the image processing unit 432, the storage server access unit 433, the data management unit 434, and the display control unit 435 to execute predetermined processes according to the contents of a request received. For example, the request control unit 431 performs control so as to perform a login process in response to a login request from the MFP 110.

The image processing unit 432 performs a character string region detection process and a character recognition process (optical character recognition process, or OCR process) on scanned images sent from the MFP 110. The image processing unit 432 further performs an analysis process such as similar form determination to determine registered previous scanned images similar to scanned images obtained by performing a scan this time, and a process of dividing a group of page-by-page scanned images based on predetermined page counts. Besides the above, the image processing unit 432 performs image modification processes such as turning and inclination correction as well. Details of the similar form determination and the division will be described later. Also, the following description will be given using forms such as estimate forms or invoices as an example of target documents, and a scanned image obtained by scanning such a form may be referred to as "form image".

The storage server access unit 433 issues a request to the cloud storage server 130 for processes. The cloud storage server 130 has made various interfaces publicly available which are for storing files in the cloud storage server 130 and obtaining stored files by using a protocol such as REST or SOAP. The storage server access unit 433 issues requests to the cloud storage server 130 by using a publicly available interface.

The data management unit 434 stores and manages, in the HDD or the like, user information, information of analysis results on images, various pieces of setting data, and so on to be managed in the MFP cooperative server 120.

The display control unit 435 performs control such that a screen will be displayed on the MFP 110, the client PC 111 connected through the Internet, or a mobile terminal (not illustrated) by transmitting screen information necessary to display that screen to the MFP 110, the client PC 111, or the mobile terminal (not illustrated). For example, the display control unit 435 returns screen information (such as HTML and CSS) necessary to display a screen in response to receiving a request from a web browser running on the client PC 111 or the mobile terminal (not illustrated). On the screen displayed by the web browser or the like, the user can issue an instruction to check registered user information, change the scan settings, check a job corresponding to undivided scanned images, select dividing pages, or execute a transmission process.

[Entire Flow of Processing]

Figure 5A:
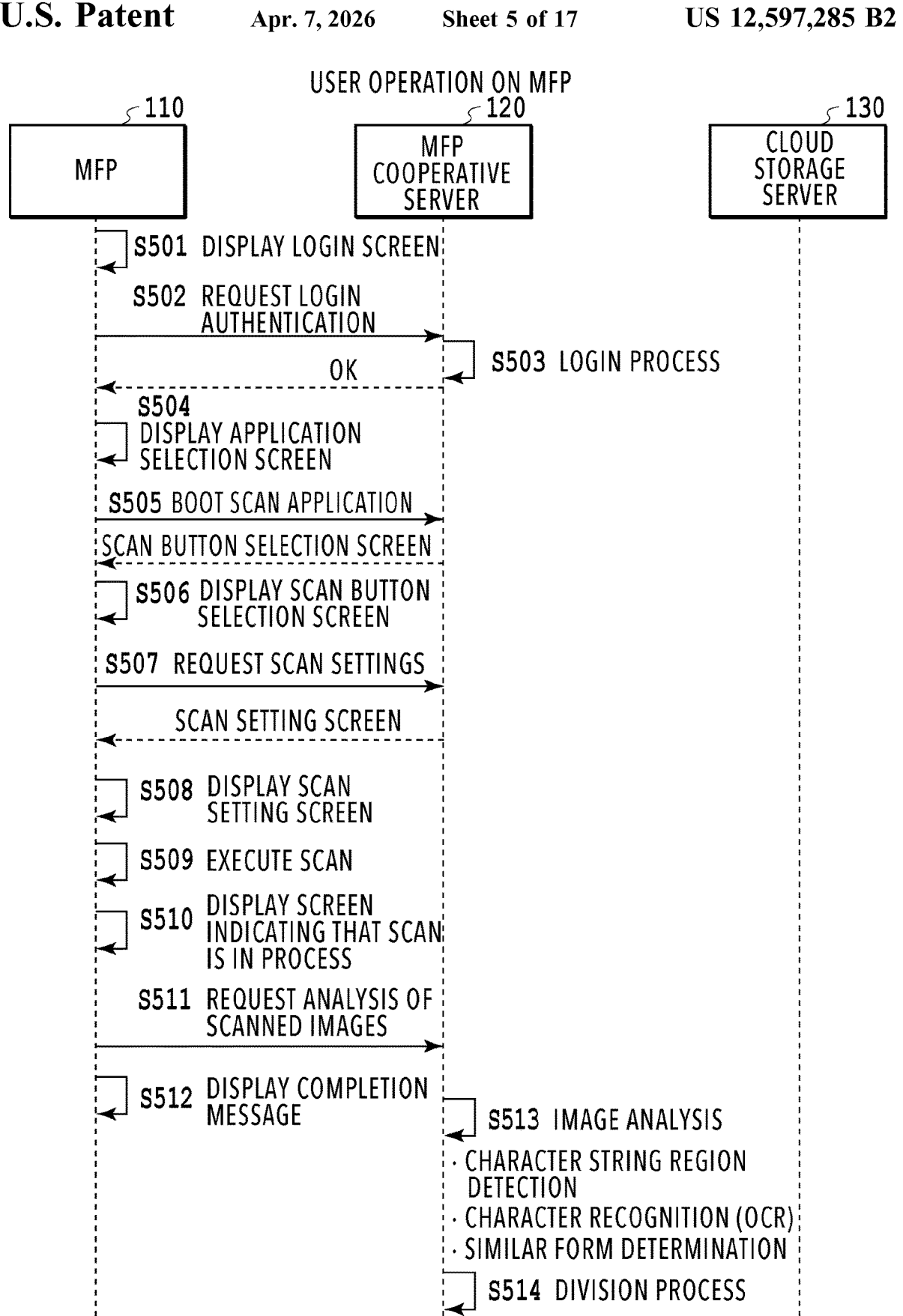
FIG. 5A is a sequence chart illustrating a flow of processing between apparatuses.
Figure 5B:
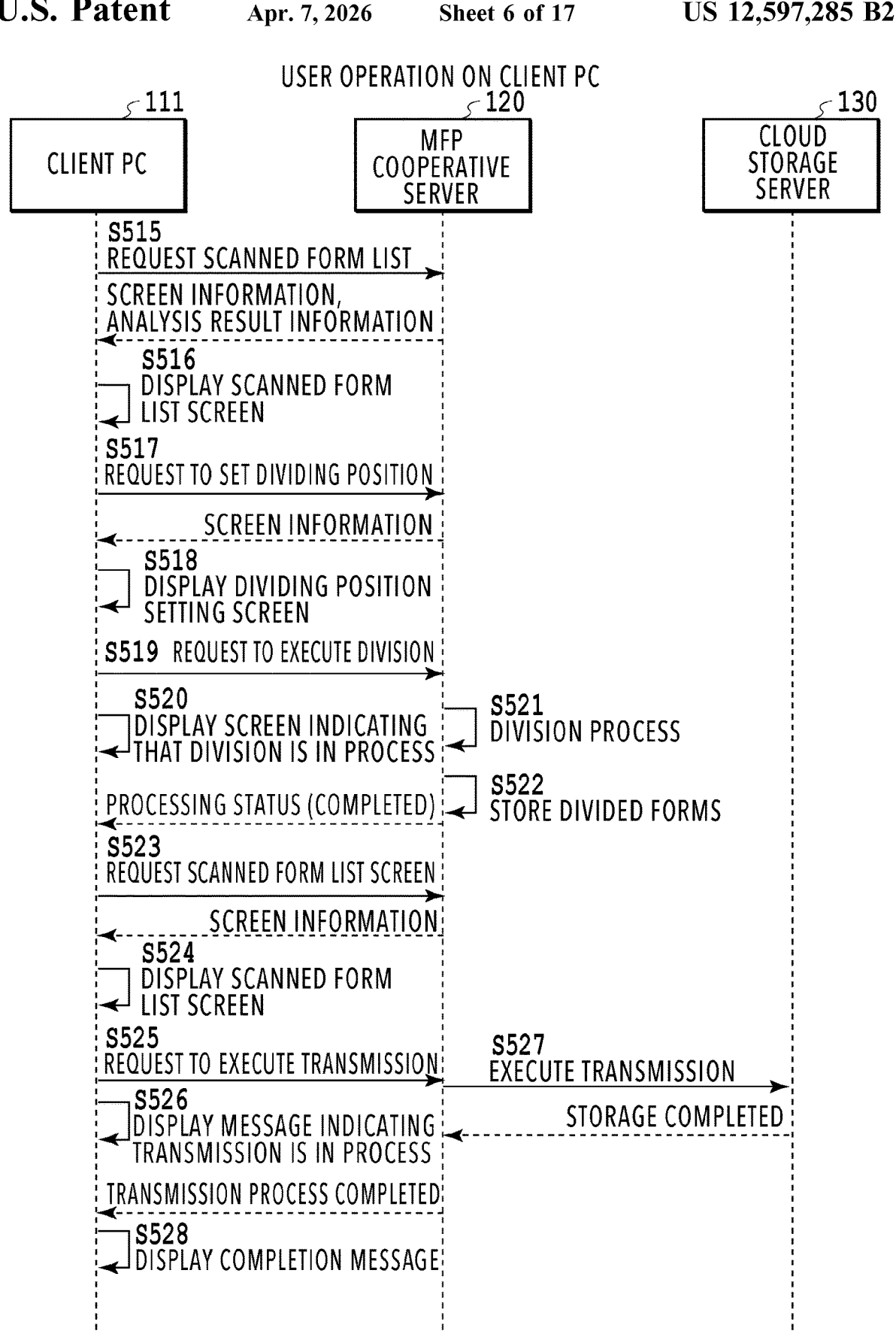
FIG. 5B is a sequence chart illustrating the flow of the processing between the apparatuses.

FIGS. 5A and 5B are sequence charts illustrating a flow of processing performed between the apparatuses in a case of scanning forms with the MFP 110, converting the scanned images obtained by the scan into files, and storing them in the storage server. FIG. 5A and FIG. 5B will be also referred to collectively as "FIG. 5". The communication between the apparatuses will be described below in chronological order along the sequence charts in FIG. 5. Note that the symbols "S" in the following description represent steps.

In S501, the display control unit 421 of the MFP 110 displays a UI screen not illustrated for inputting login authentication information for accessing the MFP cooperative server 120 (hereinafter referred to as "login screen") on the operation unit 220 of the MFP 110.

In S502, in response to the user inputting a preregistered user ID and password respectively into entry fields in the login screen and pressing a "Login" button, a login authentication request is transmitted to the MFP cooperative server 120.

In S503, in response to receiving the login authentication request, the MFP cooperative server 120 performs an authentication process by using the user ID and password contained in the request. In a case where the user is confirmed as a genuine user by the authentication process, the MFP cooperative server 120 returns an access token to the MFP 110. In a case where various requests are subsequently issued from the MFP 110 to the MFP cooperative server 120, this access token is sent along with them so that the logged-in user can be identified. In the present embodiment, by completing login to the MFP cooperative server 120, login to the cloud storage server 130 is also completed at the same time. Thus, the user associates a user ID for utilizing the MFP cooperative service and a user ID for utilizing the storage service with each other via a web browser on a PC or the like on the Internet in advance. In this way, if the authentication of login to the MFP cooperative server 120 succeeds, the authentication of login to the cloud storage server 130 is also completed at the same time. This can omit an operation for logging in to the cloud storage server 130. The MFP cooperative server 120 can handle requests related to the storage service from the user having logged in to the MFP cooperative server 120. Note that, as for the login authentication method, a generally and publicly known method (such as Basic authentication, Digest authentication, or authorization using Open Authorization (OAuth)) may be used to perform the login authentication.

In S504, after the login process is completed, the display control unit 421 of the MFP 110 displays a UI screen on which an application can be selected (hereinafter referred to as "main screen") on the operation unit 220, and displays applications usable by the MFP 110 on the main screen.

Figure 6A:
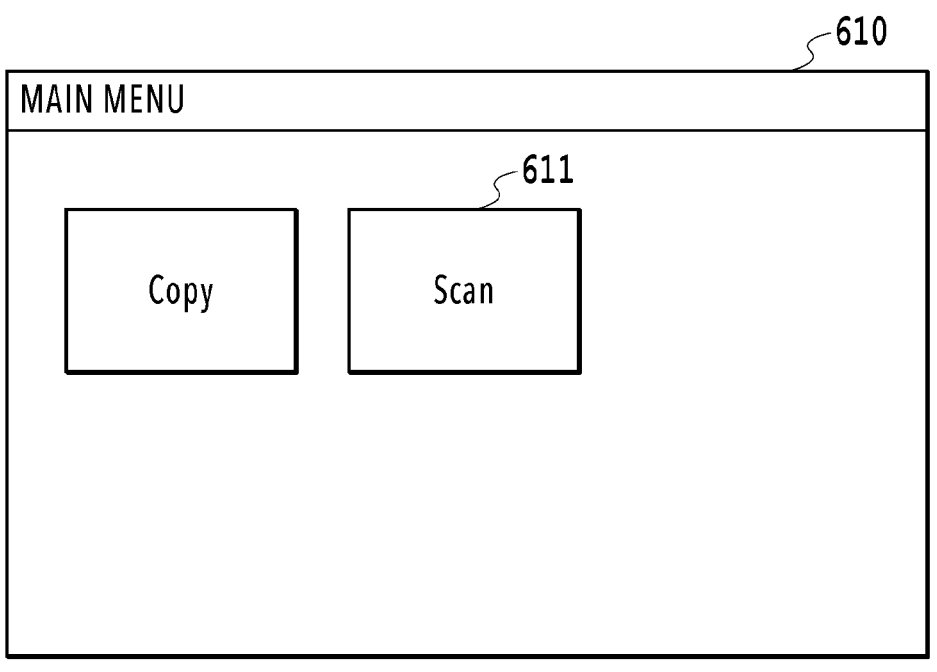
FIGS. 6A and 6B are diagrams illustrating an example of a main screen and a scan button selection screen.

FIG. 6A is a diagram illustrating an example of the main screen. By installing a dedicated application for scanning and converting forms into files and storing them in a cloud storage server in the MFP 110, a button for starting the dedicated application is displayed on a main screen 610.

In S505, in response to the user pressing a scan application 611 on the main screen 610, the cooperative service request unit 423 transmits a request to boot the scan application to the MFP cooperative server 120. The MFP cooperative server 120 obtains information necessary for displaying a screen for selecting a button for a scan process available to the logged-in user from the HDD of the MFP cooperative server 120, and transmits the information to the MFP 110.

In S506, the display control unit 421 of the MFP 110 displays the scan button selection screen on the operation unit 220 based on the information received from the MFP cooperative server 120.

Figure 6B:
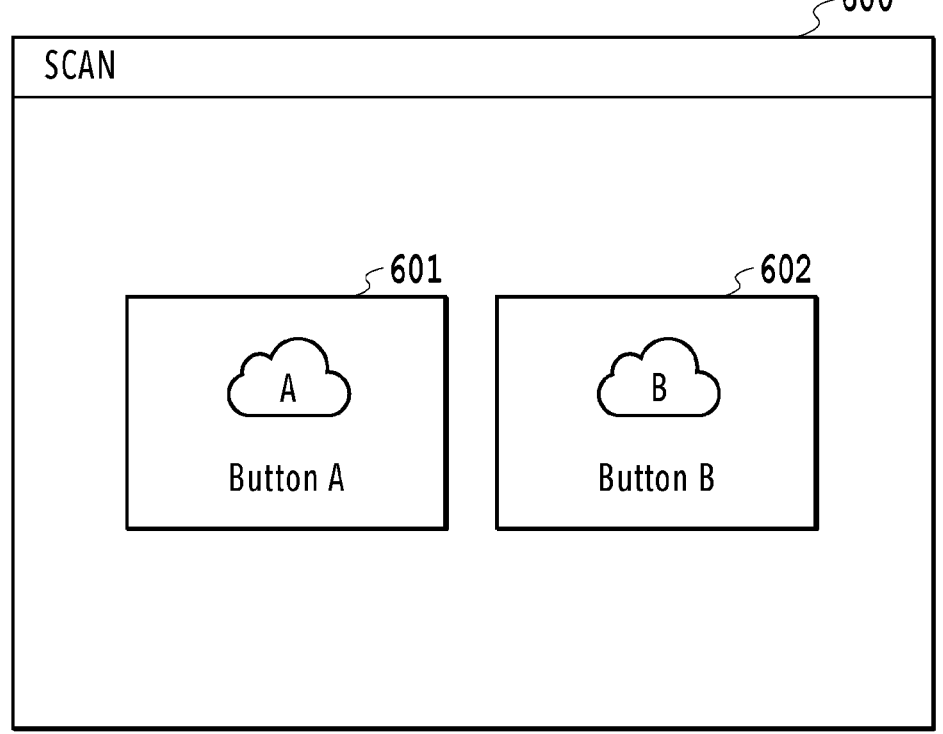

FIG. 6B is a diagram illustrating an example of a scan button selection screen 600. Buttons 601 and 602 in FIG. 6B are buttons available to the logged-in user among scan buttons registered in the MFP cooperative server 120. On a scan button registration screen 1000 (see FIG. 10), the user can register scan settings in association with a button on the scan button selection screen 600. The registered settings can be registered in the HDD of the MFP cooperative server 120 in advance. The following steps will be described on the assumption that the user has selected the button 601.

In S507, in response to the user selecting the button 601, the cooperative service request unit 423 requests the MFP cooperative server 120 to transmit scan settings set by default for the selected button 601. In response to the request to transmit the scan settings, the MFP cooperative server 120 obtains the default scan settings for the selected button 601 and information necessary for displaying a scan setting screen from the HDD of the MFP cooperative server 120 and transmits them to the MFP 110.

In S508, the display control unit 421 of the MFP 110 displays the scan setting screen on the operation unit 220 of the MFP 110 based on the information received from the MFP cooperative server 120.

Figure 7:
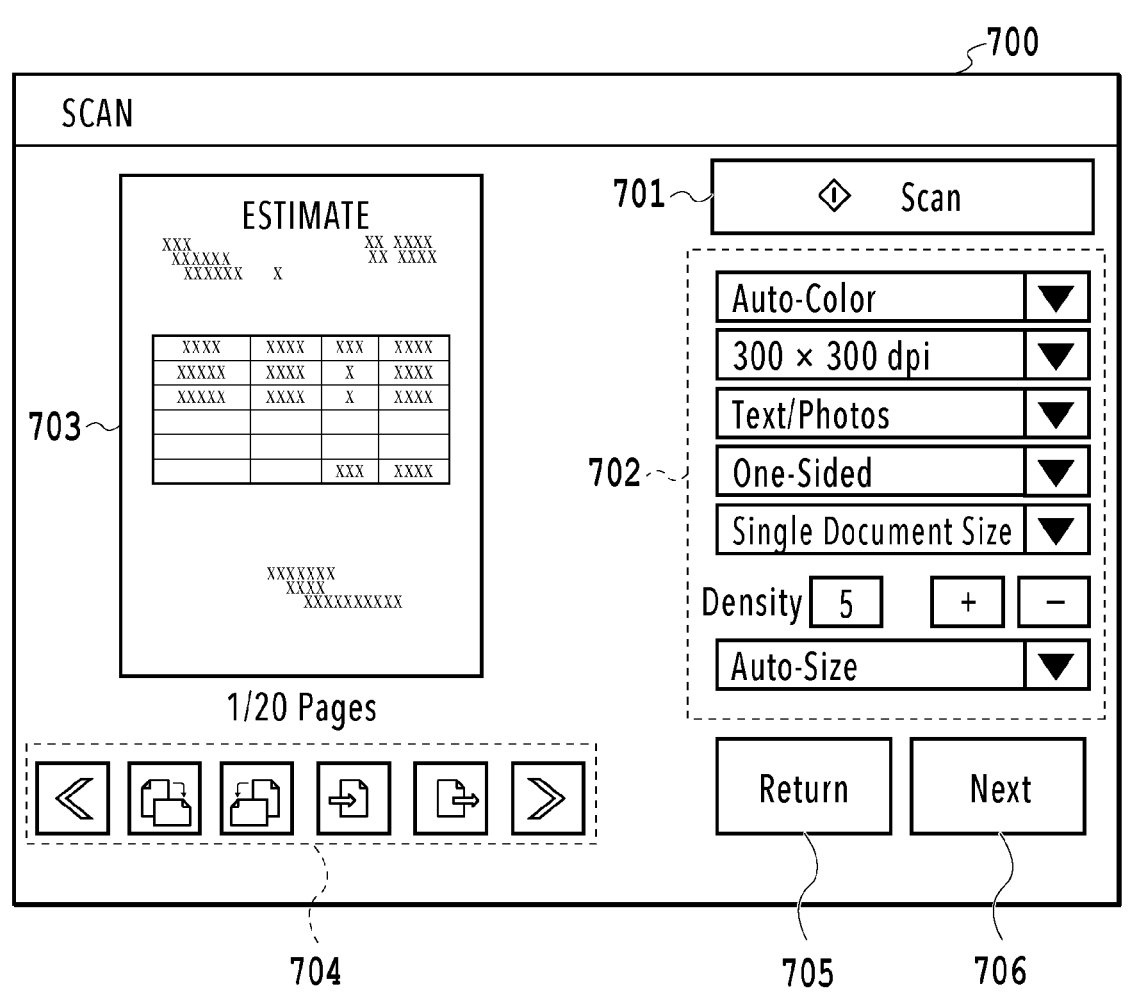
FIG. 7 is a diagram illustrating an example of a scan setting screen.

FIG. 7 is a diagram illustrating an example of a scan setting screen 700. A scan button 701 is a button for issuing an instruction to execute a scan. A setting region 702 is a region to display current scan settings such as whether to perform color printing, the resolution, the image quality, whether to perform duplex printing, whether different documents sizes are mixed, the density, and the document size. By selecting a scan setting displayed in the setting region 702, it is accepted as a scan setting to be changed. A button 705 is a button for returning to the scan button selection screen 600.

In S509, in response to the user pressing the scan button 701, the scanner 222 scans a scan-target paper form placed on the platen glass or the ADF. Then, the scan execution unit 411 generates data of a scanned image obtained by reading the scanned paper form. In a case of scanning a plurality of forms on the platen glass, the plurality of forms can be successively scanned by replacing one form with another to be scanned next and pressing the scan button 701.

After the scan is executed, a preview of a scanned form is displayed on a preview region 703 in the scan setting screen 700. A group of buttons 704 are a group of buttons for changing the image of the page displayed on the preview region 703 to the next or previous one, turning the page, deleting the page, and adding a page (performing an additional scan). A next button 706 is a button for advancing the processing of the scanned images displayed as previews to the next stage.

In S510, in response to pressing the next button 706, the display control unit 421 of the MFP 110 displays a screen indicating that a scan is in process on the operation unit 220 of the MFP 110.

In S511, the cooperative service request unit 423 of the MFP 110 transmits the scanned images obtained by the scan in S509 to the MFP cooperative server 120 along with a request to analyze those scanned images.

In S512, in a case where the scanned images and the analysis request are successfully transmitted to the MFP cooperative service, the display control unit 421 of the MFP 110 displays a message indicating that the transmission to the MFP cooperative server 120 has been completed. The user operation on the MFP 110 is done at this point.

In S513, in response to receiving the request to analyze the scanned images from the MFP 110, the image processing unit 432 of the MFP cooperative server 120 starts an image analysis on the scanned images.

In the analysis process in S513, the image processing unit 432 performs a process of detecting character string regions present in each analysis-target scanned image. For the character string region detection, a known method may be employed such as a method in which rectangular regions assumed to be characters are extracted from an image binarized based on a threshold value, for example. Next, the image processing unit 432 performs a character recognition process (OCR: Optical Character Recognition) on the detected character string regions.

Thereafter, the image processing unit 432 performs a process of comparing features of the analysis-target scanned image with features of scanned images registered as learned data and determining whether any of the scanned images is similar (form determination process). The scanned images registered as the learned data are scanned images obtained by scanning forms in the past. The forms corresponding to the previous scanned images registered as the learned data will be referred to as "registered forms". As information of the registered previous scanned images, feature information of those scanned images is stored. In the form determination process, it is determined whether the learned data contains a previous scanned image similar to the scanned image obtained by performing a scan this time. The MFP cooperative server 120 then stores analysis result information being information on the analysis-target scanned image obtained as a result of the analysis in the HDD of the MFP cooperative server 120. Details of the analysis process in S513 will be described later.

In S514, the image processing unit 432 of the MFP cooperative server 120 performs a division process. While details of this step will be described later, in a case where the division process cannot be performed in S514, the dividing pages are determined based on the user's instruction and a division process is executed in S521.

FIG. 5B is a chart for describing a step following the steps described in FIG. 5A to a step of transmitting scanned images converted into files to the cloud storage server 130. The description will be given on the assumption that the CPU of the client PC 111 performs the processing of the client PC in FIG. 5B by reading out program code stored in its ROM or HDD to its RAM and executing it. Also, the functions of some or all of the steps may be implemented with hardware such as an ASIC or an electronic circuit. Incidentally, the client PC 111 is connected to a display apparatus (not illustrated), and screens to be described later are displayed on that display apparatus. The CPU of the client PC 111 functions also as a display control unit that controls the screen to be displayed on the display apparatus.

In S515, the CPU of the client PC 111 requests the MFP cooperative server 120 to transmit information necessary for displaying a scanned form list screen. The user performs this step by accessing the MFP cooperative server 120 with the browser on the client PC 111. The MFP cooperative server 120 may identify the user by performing a login process similar to S501 to S503 in order to determine which user's scanned form list screen information to transmit. Alternatively, the MFP cooperative server 120 may identify the user by transmitting a dedicated URL that uniquely determines the user to the client PC 111 via email or the like and having the user access the MFP cooperative server 120 from that URL. In response to receiving the request from the client PC 111, the MFP cooperative server 120 transmits screen information necessary for displaying the scanned form list screen, the result of the analysis in S513, and the result of the division to the client PC 111.

In S516, the CPU of the client PC 111 displays the scanned form list screen based on the information necessary for displaying the scanned form list screen received from the MFP cooperative server 120.

Figure 8A:
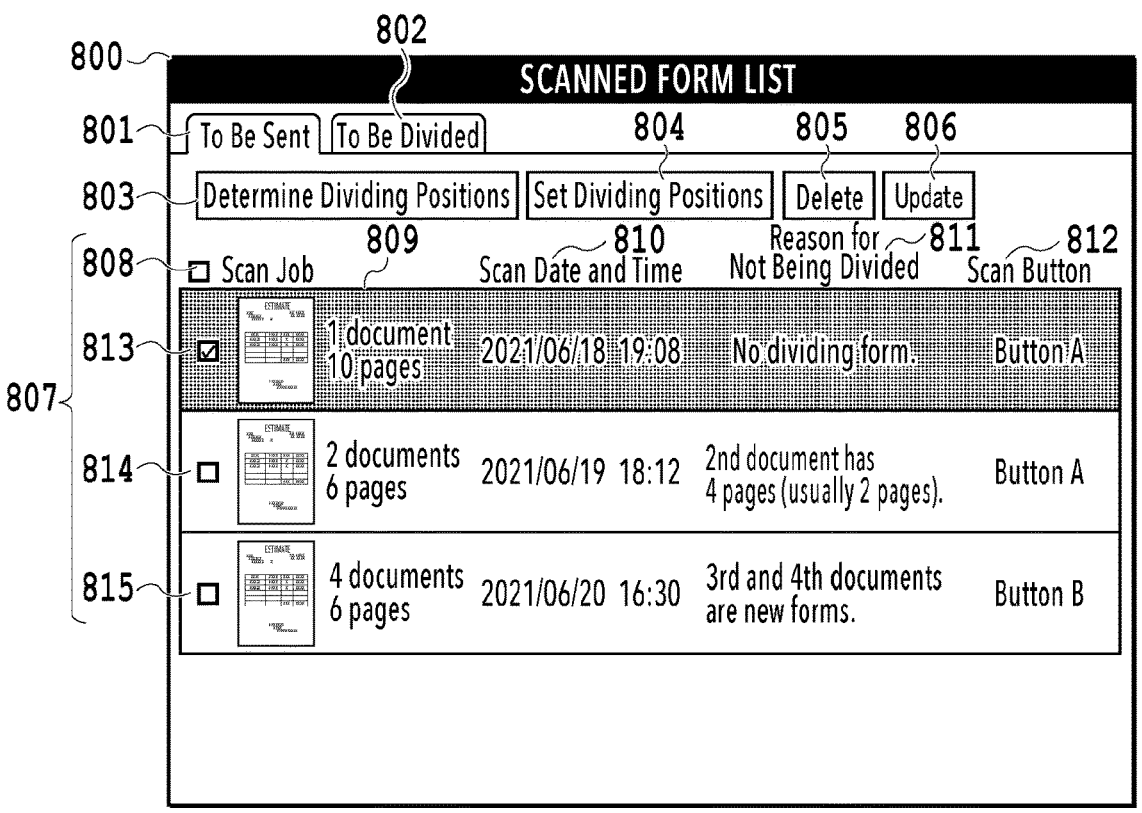
FIGS. 8A and 8B are diagrams illustrating an example of a scanned form list screen.
Figure 8B:
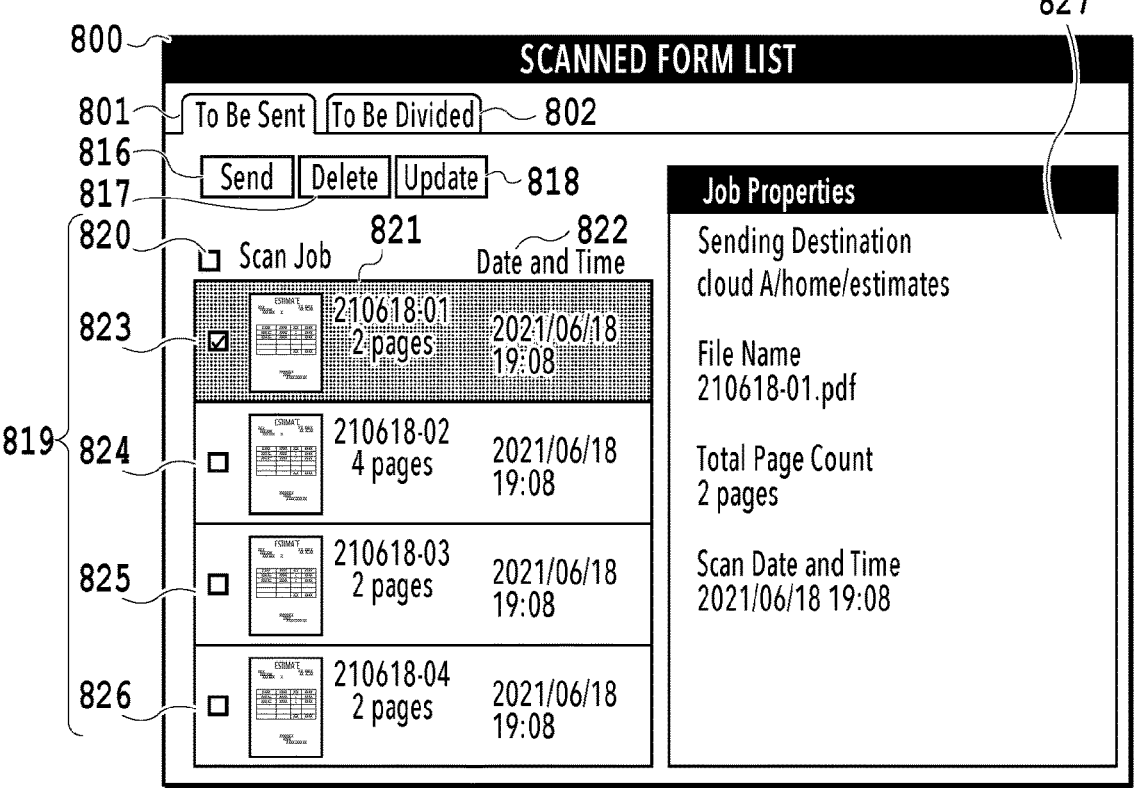

FIGS. 8A and 8B are diagrams illustrating an example of a scanned form list screen 800. The scanned form list screen 800 includes a to-be-transmitted tab 801 and a to-be-divided tab 802. The user can switch the contents to be displayed on the scanned form list screen 800 by selecting one of the tabs. As will be described later, in a case where the division process was performed in S514, no job may be displayed in the to-be-divided tab 802 on the scanned form list screen 800, and jobs may be displayed only in the to-be-transmitted tab 801.

FIG. 8A represents an example of the scanned form list screen 800 displayed in the case where the division process was not performed in S514, and is a diagram of the scanned form list screen 800 in a case where the to-be-divided tab 802 is selected. In the to-be-divided tab 802, information on scanned images yet to be divided is displayed.

An undivided job list 807 is a region to display a list of jobs for undivided groups of page-by-page scanned images. Rows 813 to 815 in the undivided job list 807 are regions to display jobs corresponding undivided scanned images. In the rows 813 to 815, jobs are displayed for respective groups of scanned images each obtained by collectively scanning forms at once.

In columns 808 to 812, items to be displayed in the undivided job list 807 are displayed.

In the column 808, check boxes are displayed. The user can select a job from the undivided job list 807 by checking the corresponding check box in the column 808. Incidentally, the check box at the top of the undivided job list 807 is a check box for collectively selecting or unselecting all jobs displayed in the undivided job list 807. The top check box is checked in a case of performing a process such as collectively determining dividing positions for the plurality of jobs or collectively deleting the plurality of j obs.

In the column 809, job information is displayed. As the job information, a thumbnail image of the first page in each group of page-by-page scanned images, the total number of pages, and the number of files (the number of documents) in a case of dividing the group at current candidate dividing pages, and so on are displayed.

In the column 810, the scan date and time are displayed. In the column 811, the reason why the group of page-by-page scanned images is in the undivided job list is displayed. In the column 812, the name of the scan button in FIG. 6B which the user selected at the time of performing the scan is displayed.

A delete button 805 is a button for deleting a job (scanned images) selected by checking the corresponding check box among the jobs displayed in the undivided job list 807. An update button 806 is a button for transmitting the request in S515 again to obtain and display information necessary for displaying the latest scanned form list screen 800. This button is pressed in a case where there are scanned images (job) that have not yet been displayed in the scanned form list screen 800, such as scanned images added later.

A dividing position determination button 803 is a button with which, in a case where the MFP cooperative server 120 has determined dividing pages, the group of page-by-page scanned images is divided based on the determined dividing pages to convert the scanned images into files as separate documents.

In the to-be-transmitted tab 801, scanned images that have been converted into files and are to be transmitted to the cloud storage server 130 are displayed. Scanned images converted into files are displayed in the to-be-transmitted tab 801 in a case where settings such, for example, as the transmission destination and file name can be changed. The dividing position setting button 804 will be described later.

S517 to S526 are processes in which, in the case where the division process was not performed in S514, the user selects dividing pages and issues an instruction to divide the scanned images. S517 to S526 are skipped in the case where the division process was performed in S514.

S517 is a process performed in a case where the user selects any of the jobs included in the undivided job list 807 and presses the dividing position setting button 804. The dividing position setting button 804 is a button for transitioning to a dividing position setting screen 900 (see FIGS. 9A and 9B) to be described later. On the dividing position setting screen 900, the user designates the scanned images of pages in the group of page-by-page scanned images at which to divide the group (referred to as "dividing pages" or "dividing positions"). Also, in a case where the MFP cooperative server 120 has determined dividing pages, the user can check those determined dividing pages. In S517, in response to pressing the dividing position setting button 804, the CPU of the client PC 111 transmits a request for information necessary for displaying a screen for checking the dividing positions for the selected job to the MFP cooperative server 120. For example, on the scanned form list screen 800 in FIG. 8A, the check box in the row 813 in the undivided job list 807 is checked, indicating that the scanned images in the job displayed in the row 813 have been selected.

In response to receiving the request in S517, the MFP cooperative server 120 transmits screen information necessary for displaying the dividing position setting screen such as data of the scanned image of each page forming the group of scanned images in the selected job to the client PC 111.

Figures 9A, 9B:
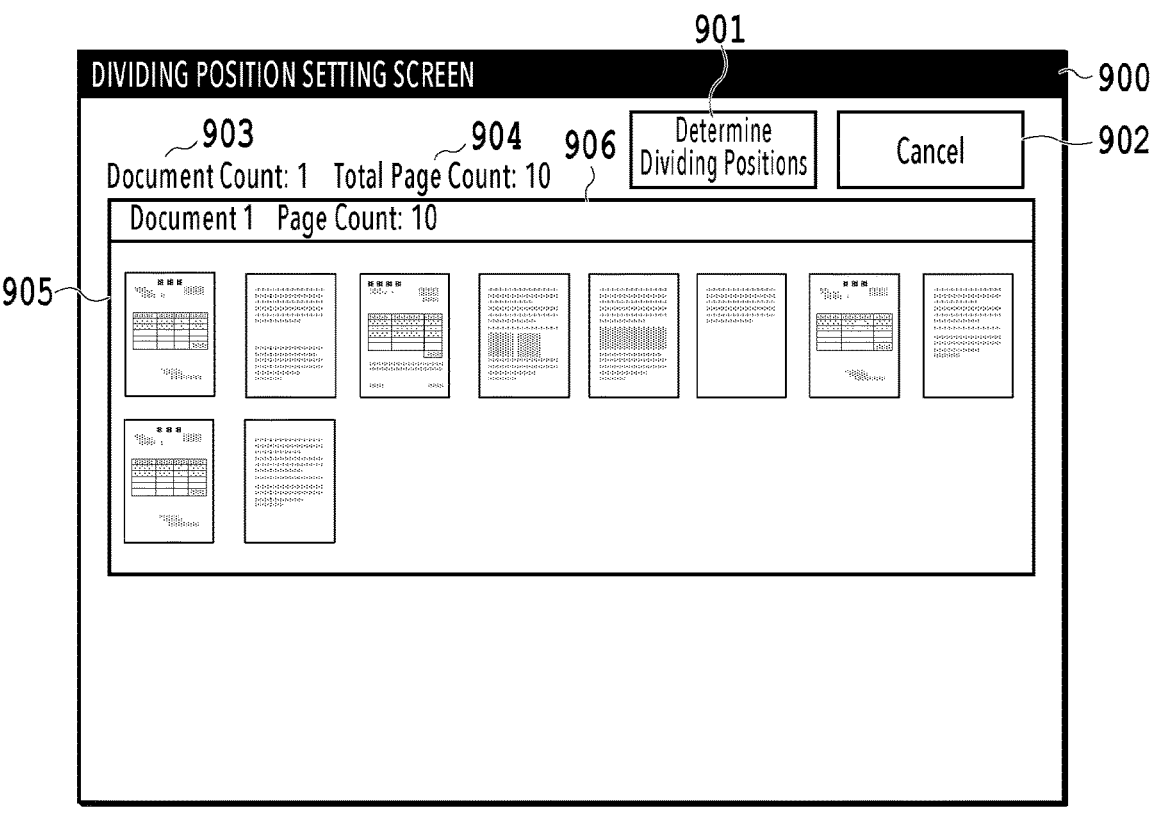
FIGS. 9A and 9B are diagrams illustrating an example of a dividing position setting screen.

In S518, the CPU of the client PC 111 displays the dividing position setting screen 900 based on the screen information received from the MFP cooperative server 120. FIGS. 9A and 9B are diagrams illustrating an example of the dividing position setting screen 900. FIG. 9A represents an example of the dividing position setting screen displayed in a case where the dividing position setting button 804 is pressed in a state where the job displayed in the row 813 in FIG. 8A is selected. The dividing position setting screen 900 in FIG. 9A represents an example of the dividing position setting screen in a case where the MFP cooperative server 120 has not determined any dividing pages.

The dividing position setting screen 900 will now be described using FIG. 9A. A dividing position determination button 901 is a button for determining dividing pages, as with the dividing position determination button 803 on the scanned form list screen 800. A cancel button 902 is a button for canceling the setting of the dividing positions and returning to the scanned form list screen 800.

A region 903 is a region to display the number of documents (files) to be generated in a case of dividing the group of page-by-page scanned images based on a currently selected dividing page to generate files. A region 904 is a region to display the total page count of the group of scanned images corresponding to the selected job.

A file detail region 906 is a region to display a set of single files based on the currently selected dividing pages. As illustrated in FIG. 9A, in a case where no dividing page has been selected, displayed is file information representing a case where the group of scanned images corresponding to the job is regarded as a single file. A preview region 905 is a region included in the file detail region 906, and is a region to display a preview of the scanned image of each page contained in the file corresponding to the file detail region 906. The user can select a dividing page by clicking the preview image of a scanned image to be the dividing page among the previews of the pages in the preview region 905. In a case where dividing pages are selected, the division setting is configured so as to divide the group of scanned images before the dividing pages to generate files.

FIG. 9B represents an example illustrating the dividing position setting screen 900 after the user has selected dividing pages (dividing positions) in FIG. 9A. FIG. 9B illustrates the screen in a case where the user has selected the third, seventh, and ninth pages as dividing pages in the group of scanned images, whose total page count is 10. Thus, in FIG. 9B, a plurality of file detail regions 907 to 909 are displayed in order to display detail information on the individual files (divided documents) generated based on these dividing pages. The file detail region 907 is a region indicating the first divided document. Unlike FIG. 9A, the page count is two. The file detail region 908 is a region indicating the second divided document. The file detail region 909 is a region indicating the third divided document. The fourth divided document is not displayed in this example as it is out of the screen, but can be displayed by sliding a scrollbar 910.

The process of S519 is a process in a case where the dividing position determination button 901 is pressed with dividing pages selected as illustrated in FIG. 9B. In S519, in response to the user's operation of pressing the dividing position determination button 901, the CPU of the client PC 111 transmits a request to execute division based on the selected dividing pages to the MFP cooperative server 120. At this time, information on the dividing pages selected by the user is transmitted together as well.

In S520, after transmitting the division execution request, the CPU of the client PC 111 displays a screen indicating that division is in process on the display apparatus not illustrated.

In S521, the MFP cooperative server 120 generates files by dividing the group of page-by-page scanned images based on the selected dividing pages.

In S522, the data management unit 434 of the MFP cooperative server 120 stores feature information of a cover page of each file obtained by the division in S521 in the HDD of the MFP cooperative server 120 as learned data. The feature information of the cover page will be used on the next and subsequent occasions to determine candidate dividing pages. The information to be stored will be specifically described later since its contents vary according to the scan button's division settings illustrated in FIG. 10. After completing the division process, the MFP cooperative server 120 transmits a notification indicating the completion of the process to the client PC 111.

In S523, in response to receiving the notification indicating the completion of the division process, the CPU of the client PC 111 requests transmission of information necessary for displaying the scanned form list screen again. The MFP cooperative server 120 transmits information on the files as the divided documents and information on the undivided jobs to the client PC 111.

In S524, the CPU of the client PC 111 displays the scanned form list screen 800 again. Assume that the dividing position determination button is pressed, thereby dividing the scanned images in the row 813 in the undivided job list 807 in FIG. 8A based on the dividing pages. In this case, the job in the row 813 stops being displayed in the undivided job list 807 in the to-be-divided tab 802.

FIG. 8B is a diagram illustrating an example of the scanned form list screen 800 after executing the division process. A job list 819 is a list of the files as the divided documents generated by dividing the group of page-by-page scanned images, and these files are one waiting to be transmitted. Rows 823 to 826 in the to-be-transmitted tab 801 indicate details of the files generated by dividing the scanned images displayed in the row 813 in FIG. 8A. In columns 820 to 822, items to be displayed in the to-be-transmitted job list 819 are displayed. In the column 820, check boxes are displayed. Like the column 808 in the to-be-divided tab 802, the check boxes are used to select or unselect the jobs (files) included in the job list 819. The column 821 is a column to display information on the files. A thumbnail image of the first page, a file name, the page count, and so on are displayed. The column 822 is a column holding the scan dates and times. The same scan date and time are set for files obtained by dividing scanned images corresponding to one scan job.

A send button 816 is a button for issuing an instruction to transmit a selected job waiting to be transmitted to the cloud storage server 130. A delete button 817 is a button for deleting a selected job waiting to be transmitted. Like the update button 806, an update button 818 is a button for obtaining the latest scanned form list again.

A property display area 827 is an area to display property information of a selected file. The transmission destination, the file name, the total page count, the scan date and time, and so on are displayed. The transmission destination or the file name may be changeable based on the job properties displayed in the property display area 827. Also, a folder name or a file name using the result of the character recognition on the scanned images may be settable.

In S525, the CPU of the client PC 111 transmits an instruction to transmit the selected file in the to-be-transmitted job list 819 to the cloud storage server 130, the instruction being transmitted to the MFP cooperative server 120. This step is performed in response to accepting the user selecting a file in the to-be-transmitted job list 819 and pressing the send button 816. At this time, in a case where data in the property display area 827 has been changed, the changed data is transmitted together.

In S526, the CPU of the client PC 111 displays a message indicating that the transmission is in process on the display apparatus.

In S527, in response to receiving the transmission execution instruction, the MFP cooperative server 120 updates the changed property information, such as the file name of the divided document requested to be transmitted. Then, the MFP cooperative server 120 transmits the generated file to the designated cloud storage server 130. Thereafter, in response to receiving a notification from the cloud storage server 130 indicating that the file has successfully been stored, the MFP cooperative server 120 notifies the client PC 111 that the transmission has been completed.

In S528, in response to receiving the transmission completion notification, the CPU of the client PC 111 displays a message not illustrated indicating that the transmission has been completed on the display apparatus not illustrated.

As described above, a group of page-by-page scanned images obtained by collectively scanning forms of a plurality of types with the MFP 110 is divided based on determined dividing pages to generate files. The generated files can be stored in the cloud storage server 130.

[Registration of Division Settings]

FIG. 10 is a diagram illustrating an example of a scan button setting screen. The scan button registration screen 1000 in FIG. 10 is a screen for registering the contents of various settings to be associated with the buttons 601 and 602 used on the MFP 110. Using the browser or the like on the client PC 111, the user can access the MFP cooperative server 120 and display the scan button registration screen 1000 on the display apparatus connected to the client PC 111. On the scan button registration screen 1000, scan settings, settings of the division process to be performed by the MFP cooperative server 120, a file format setting, and a transmission destination setting can be generated individually for each of the buttons 601 and 602. The generated settings can be stored in the HDD of the MFP cooperative server 120 in association with the scan button.

An input field 1001 is an input field for defining a button name of the scan button. The button name input in the input field 1001 is used as the button name to be displayed on the scan button selection screen 600 in FIG. 6B. FIG. 10 illustrates a screen for registering default settings after pressing the button 601 on the scan button selection screen 600, since "Button A" is displayed as the button name. A set button 1002 is a button for transitioning to a scan setting registration screen (not illustrated). On the scan setting registration screen (not illustrated), the user can register default values of the scan settings displayed in the setting region 702 in FIG. 7 in a case where the button with the button name in the input field 1001 is pressed.

A pull-down 1003 is a pull-down for registering the processing method (division method) of the division process to be executed in the case where the button with the button name in the input field 1001 is pressed. As the division method, various methods are selectable such as a method "Divide at the positions of stored forms" to be introduced in the present embodiment, as well as a method in which scanned images are divided based on pages with a bar code and blank pages and a method in which scanned images are divided at intervals of any pages. It is also possible to choose not to divide the scanned images. "Divide at the positions of stored forms" represents a method in which feature information of reference scanned images is registered in advance, and a group of page-by-page scanned images is divided with pages similar to any of the registered scanned images as dividing pages (dividing positions).

In a case where a division method has been registered for the button selected by the user on the scan button selection screen 600, a division process is performed in S514.

In a case where the division method selected with the pull-down 1003 involves an optional process, a check box or the like for enabling an associated setting is displayed under the pull-down 1003. FIG. 10 is a diagram of a case where "Divide at the positions of stored forms" is selected, and check boxes 1004 to 1006 are displayed in the case where "Divide at the positions of stored forms" is selected.

Checking the check box 1004 enables a setting "Always divide at candidate dividing pages". The setting "Always divide at candidate dividing pages" is a setting for executing a division process without checking with the user about the dividing pages in a case where the group of page-by-page scanned images includes one or more scanned images of pages similar to any of the registered previous scanned images.

Checking the check box 1005 enables a setting "Store the page count of each form". "Store the page count of each form" is a setting for registering the scanned images obtained by performing a scan this time as learned data with the page count associated with the scanned images. This setting is effective in a case of scanning forms with a fixed page count, such as two pages or five pages. For example, in a case where the page count of a form normally including two pages is three, it is possible that one extra page of form is included. Thus, by associating "2" as the page count with a registered scanned image, the MFP cooperative server 120 can prompt the user to check a form having a cover page with the same form format as the registered scanned image in a case where that form includes three pages.

Also, there is a case where the page count of each document (file) after division using a page similar to a registered scanned image as a dividing page matches the page count associated with the registered scanned image. In this case, the division is executed without checking with the user about the dividing pages if the check box 1005 is checked. This reduces the work of checking the dividing pages, which is troublesome to the user.

The check box 1006 is a check box displayed in a case where the check box 1005 is checked. Checking the check box 1006 enables a setting "Prioritize the page counts of stored forms". The setting "Prioritize the page counts of stored forms" is a setting for prioritizing the page counts associated with registered scanned images in division. For example, assume a case where "2" is associated with a registered scanned image as its page count, and the page count of a form scanned this time is determined to be three. In this case, since the page count associated with the registered scanned image is prioritized, the dividing page is determined with the third page of the form regarded as a new form. The difference in the division process by the method "Divide at the positions of stored forms" made by checking the check boxes 1004 to 1006 will be described in detail with reference to FIGS. 11A to 11C to be mentioned later.

Regions 1007, 1009, and 1011 and set buttons 1008, 1010, and 1012 are used for the user to register settings of storage in the cloud storage server 130.

The region 1007 is a region to display a folder in the cloud storage server 130 to store scanned images converted into files. The region 1007 indicates a currently set storage destination. In FIG. 10, the setting is such that files will be stored in a folder "Estimate Form" in a cloud A. The set button 1008 is a button for transitioning to a screen (not illustrated) for changing the storage destination folder.

The region 1009 is a region to display definitions for generating default file names of files to be generated from scanned images. The region 1009 indicates the current settings. In FIG. 10, the settings are such that each default file name will be generated by combining the scan date and time, any character string, and a sequential number. The file names can be defined by combining character strings extracted from the scanned images. The set button 1010 is a button for transitioning to a screen (not illustrated) for changing the definitions for default file names to be generated.

The region 1011 is a region to display a data format of files into which data of scanned images will be converted. A current setting is displayed in the region 1011. In FIG. 10, the setting is such that files will generated in PDF. The set button 1012 is a button for transitioning to a screen (not illustrated) for changing the file format setting.

A cancel button 1013 is a button for canceling the registration of the scan button settings. A save button 1014 is a button for determining the various settings of the scan button with the button name input in the input field 1001 and storing the various settings in the HDD of the MFP cooperative server 120. As described above, each individual scan button can be associated with scan settings, division process settings, file transmission settings, and so on according to the type and characteristics of forms to be scanned.

[Comparative Example of Method of Dividing Group of Page-by-Page Scanned Images at Positions of Stored Forms]

Figures 11A, 11B, 11C:
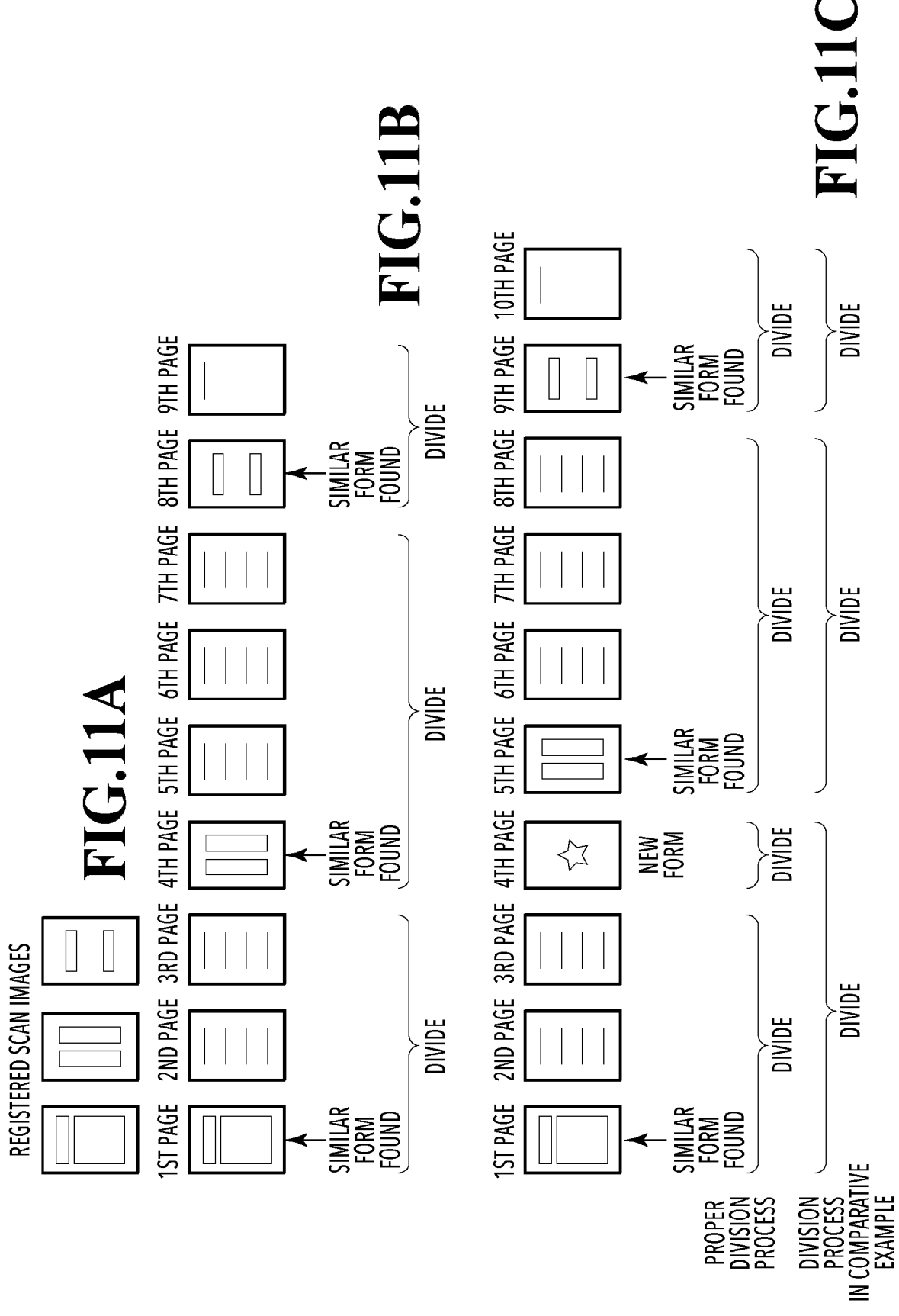
FIGS. 11A to 11C are diagrams for describing a comparative example of a method of dividing scanned images at the positions of stored forms.

FIGS. 11A to 11C are diagrams for describing a comparative example of division by the method "Divide at the positions of stored forms". FIG. 11A is a diagram illustrating registered previous scanned images. In FIG. 11A, as feature information of three types of registered scanned images, arrangement information of the character string regions on the first pages (cover pages) of the forms of the respective types is registered.

FIG. 11B illustrates a group of nine pages of scanned images obtained by collectively scanning forms of three types being a first form including three pages, a second form including four pages, and a third form including two pages. In the division method "Divide at the positions of stored forms", it is determined for each page whether its feature is similar to that of any of the registered scanned images. Assume that it is determined that there are registered scanned images similar to the scanned images of the first, fourth, and eighth pages (referred to as "similar forms"). In this case, files are each generated by dividing the scanned images from a page for which a similar form was found (dividing page) to the page preceding the page for which a similar form was found next (dividing page). Thus, in the division method "Divide at the positions of stored forms", even in a case where forms of a plurality of types are collectively scanned, the resulting group of scanned images is divided into segments by the respective form types. In this way, a file is generated for each form type.

FIG. 11C illustrates a group of 10 pages of scanned images obtained by collectively scanning forms of four types being the above three types, namely, the first form including three pages, the second form including four pages, and the third form including two pages, and additionally a fourth form including one page. The fourth form is a new form such that no form with the same format as the fourth form has never been scanned before.

A new form may be included in the group of forms to be scanned this time, as illustrated in FIG. 11C. In this case, if a division process is performed in the same manner as in the comparative example in FIG. 11B such that each page for which a similar form was found is determined as a dividing page, the pages are divided so as to convert the page of the new form into a file as a part of another form. Then, in the case where there is a new form, it may be conceivable to place the new form as the first form to be scanned, so that the new form will be distinguished. In this method, however, the user must check for new forms each time and, if there is one, scan that form first. This is troublesome to the user. In particular, with a MFP utilized by a plurality of users, it is difficult for each user to figure out whether there is new forms that have not been scanned by the other users.

One simple countermeasure is to introduce a step of checking with the user about whether the determined dividing pages are correct. However, introducing the checking step results in a step in which the user checks whether the dividing pages are correct, regardless of whether the dividing pages are correct or incorrect. This is troublesome to the user.

In the present embodiment, a method of saving the user's trouble by managing feature information of each registered scanned image in association with its page count will be described.

[Scanned Image Analysis Process]

Figure 12:
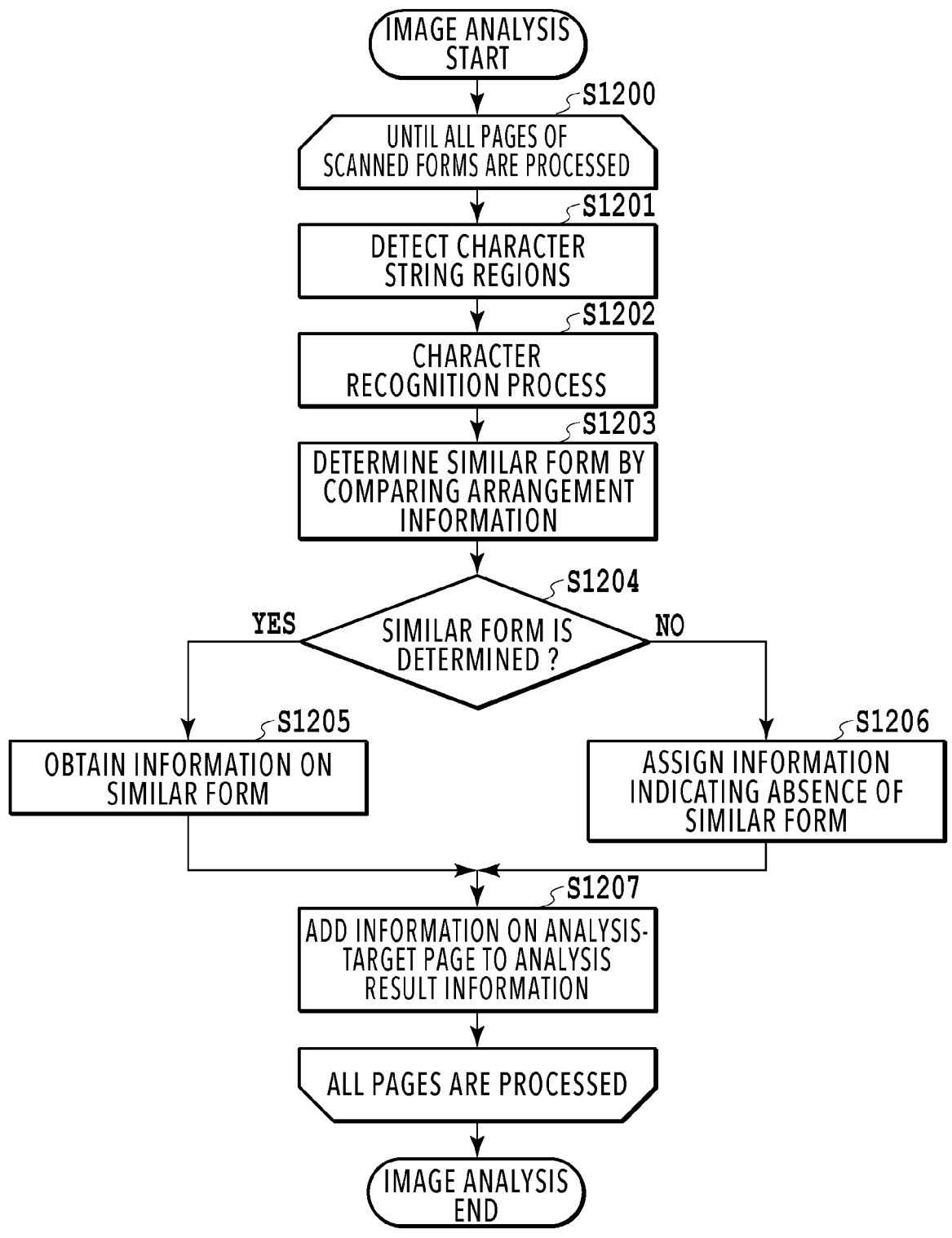
FIG. 12 is a flowchart illustrating details of an image analysis process.

FIG. 12 is a flowchart illustrating details of an analysis process performed by the image processing unit 432 of the MFP cooperative server 120 in the system. The CPU implements each process by reading out programs stored in the ROM or HDD of the MFP cooperative server 120 to the RAM and executing them. FIG. 12 is a chart illustrating details of the analysis process in S513 in FIG. 5.

The description will be given on the assumption that the group of scanned images to be analyzed this time is a group of page-by-page scanned images obtained by collectively scanning forms of a plurality of types. Each of the forms of the plurality of types may be a form including a single page or a form including a plurality of pages.

In S1200, the scanned image of an analysis-target page is selected from among the group of page-by-page scanned images obtained by scanning the forms of the plurality of types in S509. The analysis will be performed in turn starting from the first page. S1201 to S1207 after S1200 are processes to be performed on the scanned image of the analysis-target page. The processes of S1201 to S1207 are repeated until they are performed on all pages forming the group of analysis-target scanned pages.

In S1201, the image processing unit 432 of the MFP cooperative server 120 detects the character string regions present in the scanned image of the analysis-target page. As a result, the arrangement and size of each character string included in the scanned image of the analysis-target page are identified.

In S1202, the image processing unit 432 performs a character recognition process on all character string regions extracted in S1201.

In S1203, the image processing unit 432 executes a similar form determination process on the scanned image of the analysis-target page. In this similar form determination process, the image processing unit 432 compares arrangement information of the character string regions on the page to be analyzed this time obtained in S1201 and arrangement information of the character string regions on each previous scanned image registered as learned data, and determines whether or not the arrangements are the same or similar. This is based on the idea that forms can be assumed as forms of the same type created by using the same document format (form format) if their character string region arrangements are the same or similar. Then, in a case where there is a previous scanned image with a similar character string region arrangement, this previous scanned image is determined as an image of a similar form (referred to simply as "similar form").

FIG. 13 represents an example of information on registered previous scanned images stored in the HDD of the MFP cooperative server 120. In a case where a new form was scanned in the past, information on the scanned image of that new form was stored as information on a registered scanned image. In a case where a plurality of pages including a page of a new form are collectively converted into files, information on cover pages (first pages) among the plurality of pages converted into files is stored as registered scanned images.

A column 1301 holds values indicating form IDs of the registered scanned images. Each form ID is an ID uniquely indicating a registered scanned image. In a case where a plurality of pages were converted into a file, a form ID is assigned to the scanned image of the cover page.

A column 1302 holds arrangement information of character string regions obtained from the registered scanned images. In a case where a plurality of pages were converted into a file, arrangement information of character string regions detected from the scanned image of the cover page is held. In the arrangement information, the coordinates of each character string region's starting point and ending point or the like are held in a format such as JavaScript Object Notation (JSON). Thus, the similar form determination in S1203 is executed by comparing the arrangement information of the analysis-target page in the group of page-by-page scanned images obtained by performing a scan this time with the arrangement information of each registered scanned image. In a case of using the result of the character recognition process in the similar form determination, the arrangement information and the result of the character recognition process may be held together.

A column 1303 holds the page counts of documents corresponding to the registered scanned images. Each page count held in column 1303 is the page count of the previously generated file whose cover page corresponds to the registered scanned image associated with the corresponding form ID in the column 1301. Those page counts are held in the column 1303 in a case where the check box 1005 on the scan button registration screen 1000 in FIG. 10 was checked to enable the setting "Store the page count of each form".

The information on each registered scanned image listed in FIG. 13 is stored and managed by the data management unit 434 as the result of the process of S522 in FIG. 5 previously executed in response to scanning of a new form. Thus, in the present embodiment, as information on a previous scanned image of each form type, arrangement information of the character string regions in the form and the page count are stored in association with the previous scanned image.

In S1204, it is determined whether a registered previous scanned image similar to the scanned image of the analysis-target page (similar form) is determined by the process of S1203. If a similar form is determined (YES in S1204), the image processing unit 432 proceeds to S1205.

In S1205, the image processing unit 432 associates the form ID in the column 1301 associated with the determined similar form with the scanned image of the analysis-target page. The image processing unit 432 also obtains the information stored in association with the determined similar form. In a case where the division method "Divide at the positions of stored forms" is registered in the setting information and a page count is held in the column 1303 in association with the similar form, that page count is obtained.

If no similar form is determined in S1204 (NO in S1204), the image processing unit 432 proceeds to S1206. In S1206, the image processing unit 432 assigns information indicating the absence of a similar form to the scanned image of the analysis-target page.

In S1207, in a case where the analysis-target page is the first page, the image processing unit 432 generates analysis result information for collectively storing the analysis results of the scanned images of all pages. Then, the image processing unit 432 includes information on the analysis-target page in the analysis result information based on the information obtained in the preceding steps. The above is the analysis process on the scanned image of a single page. The analysis result information after being provided with information on the scanned images of all pages is stored in the HDD of the MFP cooperative server 120.

FIGS. 14A to 14C are diagrams illustrating some examples of the analysis result information generated by the image processing unit 432 and stored in the HDD of the MFP cooperative server 120. The analysis result information in FIGS. 14A to 14C represents examples of the analysis result information generated in the case where the division method "Divide at the positions of stored forms" is selected.

A column 1401 is a column holding a page number of each page in the group of page-by-page scanned images obtained by scanning forms of a plurality of types this time. A column 1402 is a column holding values each indicating the form ID of a similar form in association with the page number of a page for which the similar form was determined. As will be described later, values indicating form IDs are also held in the column 1402 for pages determined as new forms. For pages for which no similar form was determined, a value indicating the absence of a similar form ("NONE" in the present embodiment) is held. A column 1403 is a column which, in a case where a similar form was determined and the page count of that similar form is held in association with its form ID in the information of the corresponding registered scanned image in FIG. 13, holds that held page count. The page count held in the column 1403 may be referred to as "correct page count". The values held in a column 1404 will be described later.

[Division Process by Method "Divide at the Positions of Stored Forms"]

Figure 15:
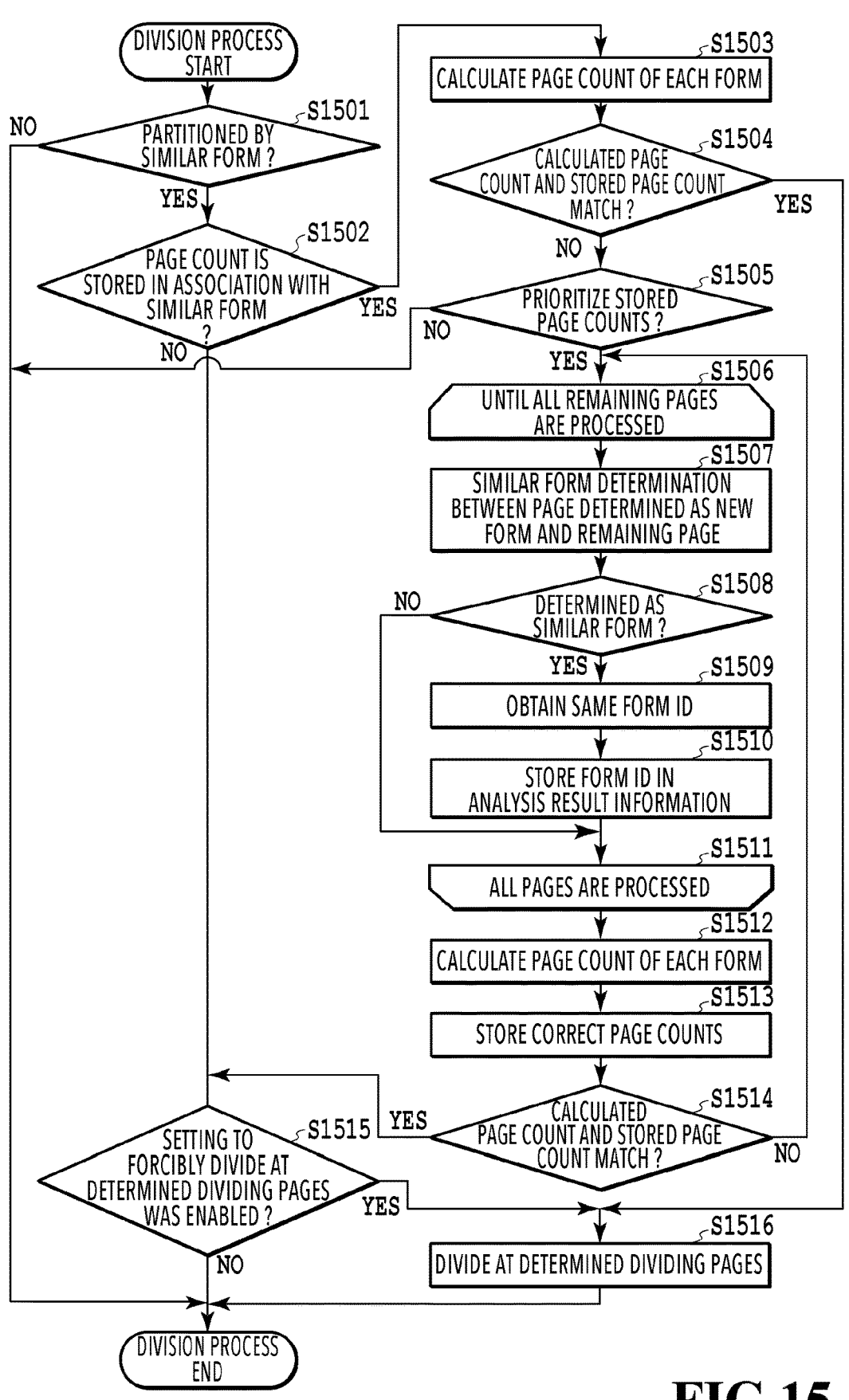
FIG. 15 is a flowchart showing details of a process of dividing scanned images based on the positions of stored forms.

FIG. 15 is a flowchart illustrating details of the division process performed in S514 by the image processing unit 432 of the MFP cooperative server 120 in the system. The division process is a process for a group of page-by-page scanned images. Thus, in a case where the processing target is not a group of page-by-page scanned images, S514 will be skipped and the processes in this flowchart will not be performed. Incidentally, a single scanned image in a group of page-by-page scanned images may simply be referred to as "page".

Also, the flowchart describes the division process in S514 in FIG. 5 in a case where the method "Divide at the positions of stored forms" is selected. For example, the image processing unit 432 of the MFP cooperative server 120 checks the selected division method based on the scan settings used this time before starting the flowchart. Then, in a case where the method "Divide at the positions of stored forms" is selected, the processes in the flowchart of FIG. 15 are performed in S514.

In S1501, the image processing unit 432 determines whether the group of page-by-page scanned images obtained by performing a scan this time includes any pages similar to registered scanned images. Specifically, the image processing unit 432 determines whether the group of page-by-page scanned images obtained by performing a scan this time includes any pages for which a similar form was determined.

The result of the determination in S1501 is NO if the column 1402, which is for holding the form IDs of similar forms in the analysis result information in FIGS. 14A to 14C, does not hold any value indicating a form ID, i.e., the column 1402 holds "NONE" in all cells of the column 1402. If there is no page for which a similar form was determined (NO in S1501), the flowchart ends. That is, in S514, the process of dividing the scanned images to generate files is not performed.

In a case where there is one or more similar forms' form IDs in the column 1402 in the analysis result information in FIG. 14A or 14B, a page for which a similar form was determined is determined to be included. If one or more pages for which a similar form was determined are included (YES in S1501), the image processing unit 432 proceeds to S1502.

In S1502, for each page for which a similar form was determined among the group of page-by-page scanned images, the image processing unit 432 determines whether a page count is stored in association with that determined similar form. No page count is stored in association with the similar form in a case where the settings used in the previous scan were such that the check box 1005 in FIG. 10 was not checked, thereby disabling the setting "Store the page count of each form". In this case, a value indicating a page count is not held in the column 1303 included in the information on the registered scanned images in FIG. 13. Specifically, even in a case where a value indicating the form ID of a similar form is held in the column 1402 in the analysis result information in FIG. 14A or 14B, no value may be held as the correct page count in the column 1403. In this case, the result of the determination in S1502 is NO.

In a case where the settings used in the previous scans were such that the setting "Store the page count of each form" in FIG. 10 was enabled, the page counts have been stored in association with the similar forms. In this case, the values of the correct page counts are held in the column 1403 in the analysis result information in FIG. 14A or 14B. In this case, the result of the determination in S1502 is YES. If page counts are stored in association with the similar forms (YES in S1502), the image processing unit 432 proceeds to S1503.

In S1503, the image processing unit 432 calculates the page count of each divided file that can be obtained by dividing the group of page-by-page scanned images from a page for which a similar form was determined to the page preceding the page for which a similar form was determined next. In other words, the image processing unit 432 calculates the page counts in a case of dividing the group of page-by-page scanned images from a page for which a value indicating a form ID is held in the column 1402 in the analysis result information to the page preceding the page for which a value indicating a form ID is held next in the column 1402. A page for which a value indicating a form ID is held in the column 1402 may be referred to as "candidate dividing page".

The image processing unit 432 stores each page count thus calculated in association with the page number of the corresponding page for which a similar form was determined. For example, as illustrated in the analysis result information in FIG. 14A or 14B, in each row with a page number holding a value indicating a form ID, the page count from that page to the page preceding the page holding a value indicating a form ID is held next as the present page count in the column 1404.

In S1504, the image processing unit 432 determines whether the page count after division associated with the page number of a page for which a similar form was determined (present page count) and the page count associated with that similar form (correct page count) match each other. This determination is made for all of the page numbers for which a similar form was determined. That is, the image processing unit 432 determines whether the values held in the column 1403 and the values held in the column 1404 under all of the above page numbers in the analysis result information match each other.

In FIG. 14A, in every row with a page number holding the value of a form ID, the correct page count associated with the similar form, which is held in the column 1403, and the present page count calculated in S1503, which is held in the column 1404, match each other. The result of the determination in S1504 is YES if the page counts match in every row holding the value of a form ID in the column 1402 as in FIG. 14A. If YES in S1504, the image processing unit 432 proceeds to S1516 to divide the scanned images.

A description will be given of the division process in the case where the correct page counts and the present page counts are determined to match in S1504 (YES) and the image processing unit 432 proceeds to S1516. The image processing unit 432 determines each page in the group of page-by-page scanned images for which a similar form was determined in the analysis process described above as a dividing page (dividing position). The image processing unit 432 then executes a process of defining a set of scanned images obtained by dividing the group of page-by-page scanned images at the dividing page as a single file. For example, with the analysis result information in FIG. 14A, files are generated by dividing the group of page-by-page scanned images based on each page count held as a correct page count so that the page number of each page for which a similar form was determined represents a cover page.

In FIG. 14B, on the other hand, the page counts of the page number 3 do not match since the correct page count held in the column 1403 is "2", and the present page count calculated in S1503, which is held in the column 1404, is "4". The result of the determination in S1504 is NO if there is a page number whose correct page count and present page count do not match each other as in the above. If the result of the determination in S1504 is NO, the image processing unit 432 proceeds to S1505.

In S1505, the image processing unit 432 determines whether the scan settings used in the scan performed this time were such that the setting "Prioritize the page counts of stored forms" was enabled. That is, if the scan was performed this time with the check box 1006 for "Prioritize the page counts of stored forms" in FIG. 10 checked, the result of the determination in S1505 is YES. If the setting "Prioritize the page counts of stored forms" was enabled (YES in S1505), the image processing unit 432 proceeds to S1506.

Proceeding to S1506, the image processing unit 432 firstly assigns a new form ID to the first page among the pages that are included in "Present Page Count" but are not included in the range of "Correct Page Count" (referred to as "out-of-range pages") as a page corresponding to a new form. For example, as illustrated in FIG. 14B, "Correct Page Count" of the page number 3 is 2, but "Present Page Count" of the page number 3 is 4. Thus, the page numbers 5 and 6, which are included in the present page count but not included in the correct page count, are the out-of-range pages. Also, the page number 5, which represents the first page among the out-of-range pages, is determined as a new form.

Then, a subsequent loop process in S1506 to S1511 is performed on the page corresponding to the new form. In the loop process, one of the pages that are not determined as a new form among the out-of-range pages (referred to as "remaining pages") is selected as a process-target page in S1506. For example, in FIG. 14B, of the page numbers 5 and 6, which are the out-of-range pages, the page with the page number 6, which is not determined as a new form, is the remaining page.

In S1507, the image processing unit 432 determines whether the page set as a new form and the process-target page are similar. The method of determining whether the pages are similar may be the same method as the similar form determination in S1203. For example, with the analysis result information in FIG. 14B, the image processing unit 432 performs a process of determining whether the page with the page number 6 determined as the process-target page and the page with the page number 5 determined as a new form are similar.

In S1508, the image processing unit 432 determines whether the process-target page and the page determined as a new form are determined to be similar in the process of S1507. If the process-target page and the page determined as a new form are determined to be similar (YES in S1508), the image processing unit 432 proceeds to S1509. For example, if the page with the page number 6 and the page with the page number 5 in FIG. 14B are determined to be similar, the image processing unit 432 proceeds to S1509.

In S1509, the image processing unit 432 assigns a form ID with the same value as that of the page determined as a new form to the process-target page, which is determined to be similar to the page determined as a new form. For example, as illustrated in FIG. 14C, if the page with the page number 6 is determined to be similar to the page with the page number 5, the image processing unit 432 assigns a form ID "formA025", which is the same form ID as that assigned to the page number 5, to the page number 6. Then, proceeding to S1510, the image processing unit 432 holds the form ID assigned in S1509 in the analysis result information.

For example, in FIG. 14B, the page with the page number 6 is the only remaining page. Thus, the loop process is performed only once. Once all of the remaining pages are processed, the loop process in S1506 to S1511 ends, and the image processing unit 432 proceeds to S1512.

In S1512, the image processing unit 432 performs a process of calculating the present page counts based on the current analysis result information as in S1503. Specifically, the image processing unit 432 calculates the page count of each divided file that can be obtained by dividing the group of page-by-page scanned images from a page for which a value indicating a form ID is held in the column 1402 in the analysis result information to the page preceding the page for which a value indicating a form ID is held next. As a result of performing the loop process in S1506 to S1511 described above, there are page numbers that newly hold values indicating form IDs in the column 1402. Thus, the result calculated in S1512 is different from the result calculated in S1503.

As illustrated in FIG. 14C, as a result of performing the loop process in S1506 to S1511 described above, a value indicating a form ID is held in the column 1402 under the page numbers 5 and 6. Thus, the present page count of the page number 3 is calculated to be two.

Further, the present page count of the page number 5 representing a page determined as a new form is calculated to be one. The page number 6 is determined as a new form since it is similar to the page with the page number 5, which is determined as a new form. The present page count of the page number 6, which is determined as a new form, is calculated to be one.

In S1513, the image processing unit 432 determines the correct page count of the page number of the page determined as a new form by the loop process in S1506 to S1511. In a case where there are a plurality of pages set as a new form by the loop process in S1506 to S1511, the image processing unit 432 determines the smallest page count among the present page counts of these pages determined as a new form. The image processing unit 432 determines the determined smallest page count as the correct page count of the page number of each page determined as a new form by the loop process in S1506 to S1511 performed this time. In a case where there is only one new form, the image processing unit 432 determines the same value as the present page count calculated in S1512 as the correct page count.

With the analysis result information in FIG. 14C, there are a plurality of pages determined as a new form, namely, the page numbers 5 and 6. Thus, the smaller of the present page counts of the page numbers 5 and 6 is held as the correct page counts of the page numbers 5 and 6. The present page counts of the page numbers 5 and 6 are both one, so that the smaller page count is one. Thus, one is held as the correct page counts of the page numbers 5 and 6. Assume, for example, that the analysis result information in FIG. 14C includes a seventh page and the present page counts of the page numbers 5 and 6 are one and two, respectively. In this case too, the smaller of the present page counts of the page numbers 5 and 6 is one, so that one is held as the correct page counts of the page numbers 5 and 6.

FIG. 14C illustrates updated analysis result information obtained by completing the processes of S1506 to S1513 on the analysis result information in FIG. 14B. As a result of the processes of S1506 to S1513, there is now a column 1405 holding a value representing a new form for the page number of each page determined as a new form among the out-of-range pages. In the analysis result information in FIG. 14C, the page number 5 is a page determined as a new form. Thus, "Yes" is held as a value indicating that the page is a new form. Also, since the page with the page number 6 has been determined to be similar to the page with the page number 5, which has been determined as a new form, "Yes" is held for the page with the page number 6 as a value indicating that the page is a new form. The present page counts of the page numbers 5 and 6 have been updated to one.

Now, if it is determined that the pages with the page numbers 5 and 6 in the analysis result information in FIG. 14B are not similar (NO in S1508), the page number 5 is determined as a new form, and a form ID is assigned only to the page number 5 and held in the column 1402.

S1514 is a similar process to S1504. In S1514, the image processing unit 432 determines whether the present page count and the correct page count in a row holding a value indicating a form ID in the column 1402 match each other. This determination is made for every row holding a value indicating a similar form ID in the column 1402.

If the correct page count and the present page count do not match each other (NO in S1514), the image processing unit 432 returns to S1506. In S1506, the image processing unit 432 executes the processes of S1507 to S1513 again such that, of the redundant pages including the one determined to be a non-matching page in S1514, the first page is determined as a new form, and the pages other than that determined as a new form among the redundant pages are the remaining pages.

Assume, for example, that the analysis result information in FIG. 14C includes a seventh page and the present page counts of the page numbers 5 and 6 are one and two, respectively. In this case, as described above, 1 is held as the correct page counts of the page numbers 5 and 6. This makes the seventh page a redundant page. Thus, a new form ID is assigned to the seventh page as a new form.

If the correct page count and the present page count match each other (YES in S1514), the image processing unit 432 proceeds to S1515. With FIG. 14C, the result of the determination in S1514 is YES, and the image processing unit 432 proceeds to S1515. The image processing unit 432 also proceeds to S1515 if the result of the determination in S1502 is NO.

In S1515, the image processing unit 432 determines whether the scan settings used in the scan performed this time were such that the setting "Always divide at candidate dividing pages" was enabled. For example, in a case where the scan was performed this time with the check box 1004 for "Always divide at candidate dividing pages" in FIG. 10 checked, the result of the determination in S1515 is YES. If the setting "Always divide at candidate dividing pages" was selected (YES in S1515), the image processing unit 432 proceeds to the division process in S1516.

A description will be given of the division process performed in S1516 in a case where the result of the determination in S1514 is YES and the result of the determination in S1515 is YES. This division process is, for example, one performed in a case where the analysis result information in FIG. 14C is obtained as a result of the loop process in S1506 to S1511 and the setting "Always divide at candidate dividing pages" was selected. The image processing unit 432 executes the division process such that each page for which a similar form was found or each page determined as a new form in the group of page-by-page scanned images is determined as a dividing page. For example, with the analysis result information in FIG. 14C, the pages with the page numbers 1, 3, 5, and 6, each of which is associated with a value indicating a form ID in the column 1402, are determined as dividing pages. The image processing unit 432 generates files by dividing the group of page-by-page scanned images based on the page counts held as the correct page counts such that the pages with the page numbers 1, 3, 5, and 6 will be the cover pages of the respective files. Thus, in the present embodiment, the group of page-by-page scanned images is divided based on the page counts determined in S1513 even in a case where a new form is included between forms of a plurality of types.

Next, a description will be given of the division process performed in S1516 in a case where the image processing unit 432 proceeds to S1516 as a result of determining NO in S1502 and YES in S1515. This division process is, for example, one performed in a case where the analysis result information obtained by the analysis in S513 has shifted to the state of FIG. 14B and the setting "Always divide at candidate dividing pages" was selected. The image processing unit 432 executes the division process such that each page for which a similar form was found in the group of page-by-page scanned images is determined as a dividing page. For example, with the analysis result information in FIG. 14B, the pages with the page numbers 1 and 3, each of which holds the value of a form ID in the column 1402, are determined as dividing pages. The image processing unit 432 generates files by dividing the group of page-by-page scanned images based on the page counts held as the present page counts such that the pages with the page numbers 1 and 3 will be the cover pages of the respective files.

In a case where the image processing unit 432 transitions to S1516 and performs the division process, the job corresponding to the scanned images to be processed this time is no longer displayed in the to-be-divided tab 802 in FIG. 8, and the divided files are displayed in the to-be-transmitted tab 801 from the start. In the case where the image processing unit 432 transitions to S1516 and performs the division process, the group of page-by-page scanned images is divided without having the user select the dividing pages.

The check box 1004 for "Always divide at candidate dividing pages" is checked in a case of scanning no new form and changing the page count of the form of each type. Also, it is preferable to perform scans with neither the check box 1005 for "Store the page count of each form" nor the check box 1006 for "Prioritize the page counts of stored forms" checked.

On the other hand, if the scan settings used in the scan performed this time were such that the setting "Always divide at candidate dividing pages" was not enabled (NO in S1515), the flowchart ends without executing the division process in S1516.

Also, if the scan settings used in the scan performed this time were such that the setting "Prioritize the page counts of stored forms" was not enabled (NO in S1505), the flowchart ends without executing the division process in S1516.

In the case of skipping S1516 and thus terminating the flowchart without performing the division process, it means that the division process is not performed in S514. In that case, division will be performed if the user issues an instruction to perform the division. That is, in S516 in FIG. 5, the scanned form list screen 800 in FIG. 8A is displayed, and the job is displayed in the undivided job list in the to-be-divided tab 802 of the scanned form list screen 800. The user can select dividing pages on the dividing position setting screen 900, which can be reached by pressing the dividing position setting button 804. Even in the case of skipping S1516, each page for which a similar form was found and each page determined as a new form are determined as candidate dividing pages among the group of page-by-page scanned images as a result of the processing in the flowchart of FIG. 15. Thus, the dividing position setting screen 900 is generated based on the determined candidate dividing pages.

In the case of skipping S1516 and terminating the flowchart without executing the division process, the reason for not executing the division process is displayed in the column 811 of the scanned form list screen 800, which displays reasons for not being divided. For example, there is a case where, like the analysis result information in FIG. 14B, the correct page count of the similar form with the page number 3 is two but its present page count is four, and the non-matching page counts make it impossible to perform a division process in S1516. In this case, a message "2nd document has 4 pages (usually 2 pages)." is displayed as the reason for not being divided in the column 811.

Figure 16A:
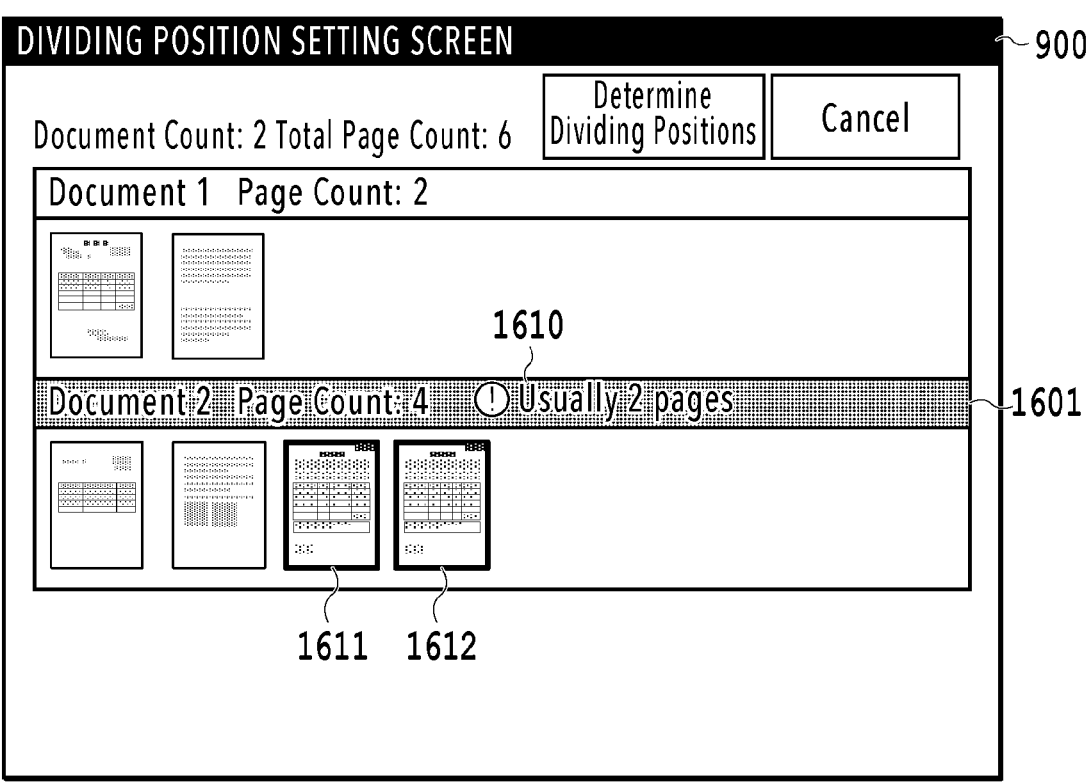
FIGS. 16A and 16B are diagrams illustrating an example of a dividing position setting screen.
Figure 16B:
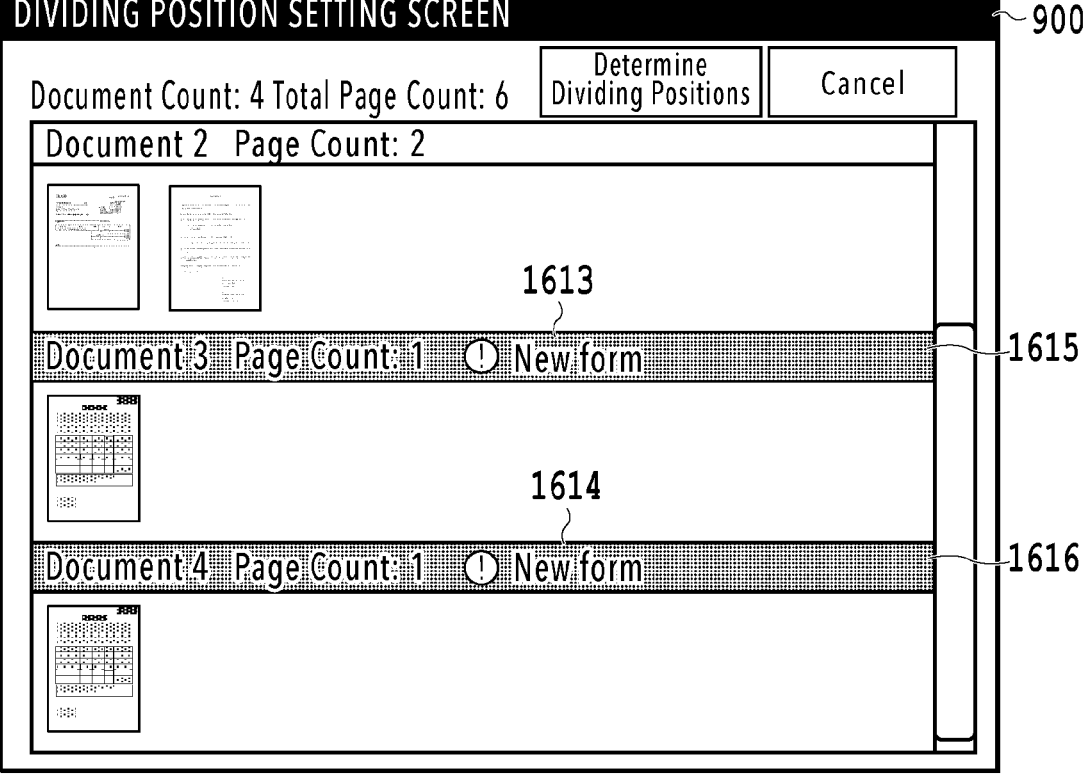

FIGS. 16A and 16B are diagrams illustrating the dividing position setting screen 900 displayed in S518 in a case of skipping S1516 and thus not performing the division process in S514. FIG. 16A represents an example of the dividing position setting screen displayed in response to the user pressing the dividing position setting button 804 with the row 814 in the undivided job list on the scanned form list screen 800 selected, for example.

The dividing position setting screen 900 in FIG. 16A is a screen corresponding to the analysis result information in FIG. 14B, for example. A remainder message 1610 addressed to the user is displayed in a file detail region 1601 for the page numbers in the analysis result information whose correct page count held in the column 1403 and present page count held in the column 1404 do not match each other. Also, in the file detail region 1601, previews 1611 and 1612 of the subsequent pages out of the range of two pages, which corresponds to the correct page count, are highlighted with frames indicating attention is required, for example.

Incidentally, in a case where the dividing position determination button 803 on the scanned form list screen 800 is pressed without transitioning to the dividing position setting screen 900, the division process is performed based on the candidate dividing pages determined in the flowchart of FIG. 15. There is a case where the user knows that forms of a plurality of types scanned this time generally include two pages each but a form of a type including four pages is included this time. In this case, the user may press the dividing position determination button 803 on the scanned form list screen 800 without displaying the dividing position setting screen 900 in FIG. 16A. That is, with the analysis result information in FIG. 14B, the user can issue an instruction to perform division so as to divide the pages with the page numbers 2 to 4 to generate files by pressing the dividing position determination button 803.

There is a case where the flowchart of FIG. 15 ends without performing the division process as a result of skipping S1516 after the loop process in S1506 to S1511 in FIG. 15. In this case, the reason for not being divided that is based on the result of the similar form determination performed in S1506 to S1511 is displayed in the column 811 of the scanned form list screen 800, which displays reasons for not being divided. For example, the division process may not be performed in S1516 even in a case where the page numbers 5 and 6 are determined as new forms, like the analysis result information in FIG. 14C. In this case, a message "The third and fourth documents are new forms" is displayed as the reason for not being divided in the row 815.

FIG. 16B represents an example of the dividing position setting screen 900 displayed in response to the user pressing the dividing position setting button 804 with the row 815 in the undivided job list on the scanned form list screen 800 selected, for example. In the analysis result information in FIG. 14C, the pages with the page numbers 5 and 6 are determined as new forms. The dividing position setting screen 900 in FIG. 16B is a screen corresponding to the analysis result information in FIG. 14C, in which messages 1613 and 1614 respectively indicating that documents 3 and 4 corresponding to the new forms are "new form" are displayed. In a case where the user presses the dividing position setting button 804 on the scanned form list screen 800 to open the dividing position setting screen 900, file detail regions 1615 and 1616 corresponding the new forms are highlighted. In this way, the user can easily find the scanned images that need to be checked.

Incidentally, there may be a case where the user wishes to divide the fifth and sixth pages among the scanned images obtained by performing a scan this time into separate files. In this case, the user may press the dividing position determination button 803 on the scanned form list screen 800 without displaying the dividing position setting screen 900 in FIG. 16B. That is, with the analysis result information in FIG. 14C, the user can issue an instruction to perform division so as to divide the pages with the page numbers 5 and 6 to generate files by pressing the dividing position determination button 803.

There is a case where forms of a plurality of types scanned this time include new forms as above, and the form of each type making up the forms of the plurality of types has the same page count. In this case, it is preferable not to check the check box 1004 for "Always divide at candidate dividing pages". Also, it is preferable to perform the scan with the check box 1005 for "Store the page count of each form" checked. It is preferable not to check the check box 1006 for "Prioritize the page counts of stored forms" even in a case where the possibility of forms having different page counts is low. However, in a case where the page count of each form is certainly the same and fixed, it is preferable to perform the scan with the check box 1006 checked.

Also, in the case where the page count of each form is fixed, checking the check box 1004 for "Always divide at candidate dividing pages" in FIG. 10 further reduces the burden on the user for checking the dividing positions.

As described above, in the division process method in the present embodiment, features of forms that are cover pages and their page counts are managed in association with each other. In this way, it is possible to reduce the user's trouble of selecting or checking dividing pages in a group of page-by-page scanned images. For example, according to the present embodiment, it is possible to reduce the user's trouble of checking whether new forms are within a stack of documents to be scanned. Also, the user can skip the check in a case where the user can determine that no new form is included.

With the technique of the present disclosure, it is possible to divide a group of page-by-page scanned images obtained by collectively scanning forms of a plurality of types by the form types while reducing burdens on the user.

OTHER EMBODIMENTS

In the above embodiment, the analysis process and the division process on scanned images have been described as processes performed by the image processing unit 432 of the MFP cooperative server 120. However, they may be performed by the image processing unit 424 of the MFP 110.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-079408 filed May 13, 2022, which is hereby incorporated by reference wherein in its entirety.

What is claimed is:

1. An image processing apparatus comprising:
at least one memory that stores instructions; and
at least one processor that executes the instructions to:
obtain scanned images by using a scanner;
manage page counts and feature information of images included in respective forms in association with the respective forms;
execute a similar form determination based on feature information of the respective scanned images and the feature information of the images included in respective form types;
determine a dividing position based on a result of a comparison between a first page count in each document when the scanned images are divided into multiple documents using candidate dividing positions corresponding to each of pages corresponding to similar images determined by the similar form determination and a second page count managed in association with each of the forms used by the similar form determination; and
divide the scanned images based on the determined dividing position.

2. The image processing apparatus according to claim 1, wherein the candidate dividing positions are determined as dividing positions to be used in a case where the first page count for each document obtained by dividing the scanned images based on the candidate dividing positions matches the second page count associated with a corresponding similar form.

3. The image processing apparatus according to claim 1, wherein the at least one processor further transmits information for displaying a setting screen including the determined dividing position, wherein the scanned images are divided based on a dividing position selected by a user via the setting screen.

4. The image processing apparatus according to claim 3, wherein information for displaying a list screen that displays information on the scanned images is transmitted, and
a first region and a second region are separately displayed on the list screen, the first region being a region to display scanned images for which the user needs to set the dividing position via the setting screen, the second region being a region to display the scanned images after being divided by the division.

5. The image processing apparatus according to claim 4, wherein a reason why the scanned images were not divided by the division unit is displayed in the first region.

6. The image processing apparatus according to claim 3, wherein the information necessary for displaying the setting screen are provided to an apparatus connected to a display apparatus to perform control so as to display the setting screen.

7. The image processing apparatus according to claim 1, wherein in a case where a new form including a plurality of pages is scanned, feature information of an image of a first page among the plurality of pages and a page count of the plurality of pages are managed in association with the new form.

8. The image processing apparatus according to claim 1, wherein the feature information is information on arrangement of a character string region.

9. An image processing method comprising:
obtaining scanned images by using a scanner;
managing page counts and feature information of images included in respective forms in association with the respective forms;
executing a similar form determination based on feature information of the respective scanned images and the feature information of the images included in respective form types;
determining a dividing position based on a result of a comparison between a first page count in each document obtained by dividing the scanned images into multiple documents using candidate dividing positions corresponding to each of pages corresponding to similar images determined by the similar form determination and a second page count managed in association with each of the forms used by the similar form determination; and
dividing the scanned images based on the determined dividing position.

10. A non-transitory computer readable storage medium storing a program which causes a computer to perform an image processing method, the image processing method comprising:
obtaining scanned images by using a scanner;
managing page counts and feature information of images included in respective forms in association with the respective forms;

executing a similar form determination based on feature information of the respective scanned images and the feature information of the images included in respective form types;

determining a dividing position based on a result of a comparison between a first page count in each document when the scanned images are divided into multiple documents using candidate dividing positions corresponding to each of pages corresponding to similar images determined by the similar form determination and a second page count managed in association with each of the forms used by the similar form determination; and dividing the scanned images based on the determined dividing position.

* * * * *